(12) United States Patent
Nelson et al.

(10) Patent No.: US 6,340,509 B1
(45) Date of Patent: Jan. 22, 2002

(54) COMPOSITE BICYCLE FRAME AND METHOD OF CONSTRUCTION THEREOF

(75) Inventors: Ronald H. Nelson, Salt Lake County; Dimitrije Milovich, Salt Lake City; Paul Nordstrom Clark, Sandy; Gregory Joseph Loughry, Salt Lake City, all of UT (US)

(73) Assignee: Radius Engineering, Inc., Salt Lake City, UT (US)

( * ) Notice: Subject to any disclaimer, the term of this patent is extended or adjusted under 35 U.S.C. 154(b) by 0 days.

(21) Appl. No.: 08/865,493

(22) Filed: May 29, 1997

Related U.S. Application Data

(63) Continuation-in-part of application No. 08/839,110, filed on Apr. 23, 1997, now Pat. No. 5,985,197.

(51) Int. Cl.[7] .......................... B29D 9/00; B29D 23/00; B32B 31/00
(52) U.S. Cl. ................. 428/34.7; 428/36.1; 428/36.91; 156/156; 156/188; 156/189; 156/245; 156/293; 264/221; 264/258; 264/512; 264/523; 264/546; 264/552; 280/281.1; 280/288.3
(58) Field of Search ............................... 428/34.5, 34.7, 428/36.1, 36.9; 156/156, 245, 188, 189, 194, 293; 264/221, 226, 227, 512, 522, 563, 546, 552, 258; 280/281.1, 288.3

(56) References Cited

U.S. PATENT DOCUMENTS 1,117,916 A 11/1914 Schmidt
2,080,698 A 5/1937 Clark ........................ 29/148.2
3,233,916 A 2/1966 Bowden ..................... 280/274
3,268,636 A 8/1966 Angell, Jr. .................... 264/51
3,375,024 A 3/1968 Bowden ..................... 280/281
3,493,240 A 2/1970 Jenks ...................... 280/11.13
3,641,230 A 2/1972 Jenks ......................... 264/152

(List continued on next page.)

FOREIGN PATENT DOCUMENTS

FR    2 670 120    6/1992
FR    2 670 121    6/1992
GB    2 250 443    6/1992
JP    3034-870     9/1976

*Primary Examiner*—Rena L. Dye
(74) *Attorney, Agent, or Firm*—James Lawrence Sonntag

(57) ABSTRACT

Bicycle frame components without laps made by a method comprising;
  shaping a fluid-removable core in the general form of the component,
  placing a flexible inflatable bladder around the core,
  wrapping over the assembly of core and bladder at least one ply of fiber impregnated with a curable resin, forming a cured part by inflating the bladder while the assembly of core, bladder, and impregnated fiber is in a mold to force the plies against the inner surfaces of the mold, such that compaction of the fiber against the mold is predominantly from the bladder inflation and not from the core, and heating to cure the resin to form a cured part, removing the bladder and the fluid-removable core from the interior of the cured part by disintegrating the fluid-removable core with a fluid sufficient to allow removal of the core and the bladder.

5 Claims, 29 Drawing Sheets

U.S. PATENT DOCUMENTS

| | | | | |
|---|---|---|---|---|
| 3,722,612 | A | 3/1973 | Issigonis et al. | 180/32 |
| 3,833,242 | A | 9/1974 | Thompson, Jr. | 280/281 |
| 3,884,521 | A | 5/1975 | Moore | 296/31 P |
| 4,015,854 | A | 4/1977 | Ramond | 280/281 R |
| 4,230,332 | A | 10/1980 | Porsche | 280/281 B |
| 4,397,048 | A | 8/1983 | Brown et al. | 3/2 |
| 4,479,662 | A | 10/1984 | Defour et al. | 280/281 R |
| 4,493,749 | A | 1/1985 | Brezina | 156/187 |
| 4,513,986 | A | 4/1985 | Trimble | 280/281 R |
| 4,613,146 | A | 9/1986 | Sharp et al. | 280/281 B |
| 4,705,286 | A | 11/1987 | Lausier et al. | 280/281 R |
| 4,741,578 | A | 5/1988 | Viellard | 301/63 PW |
| 4,828,781 | A | 5/1989 | Duplessis et al. | 264/250 |
| 4,850,607 | A | 7/1989 | Trimble | 280/281.1 |
| 4,856,801 | A | 8/1989 | Hollingsworth | 280/284 |
| 4,889,355 | A | 12/1989 | Trimble | 280/281.1 |
| 4,900,048 | A | 2/1990 | Derujincky | 280/281.1 |
| 4,900,049 | A | 2/1990 | Tseng | 280/281.1 |
| 4,900,050 | A | 2/1990 | Bishop et al. | 280/281.1 |
| 4,902,160 | A | 2/1990 | Jeng | 403/205 |
| 4,902,458 | A | 2/1990 | Trimble | 264/46.6 |
| 4,923,203 | A | 5/1990 | Trimble et al. | 280/288.3 |
| 4,931,247 | A | 6/1990 | Yeh | 264/258 |
| 4,934,724 | A | 6/1990 | Allsop et al. | 280/281.1 |
| 4,941,674 | A | 7/1990 | Trimble | 280/281.1 |
| 4,982,975 | A | 1/1991 | Trimble | 280/281.1 |
| 4,986,949 | A | 1/1991 | Trimble | 264/258 |
| 5,028,464 | A | 7/1991 | Shigetoh | 428/35.9 |
| 5,029,888 | A | 7/1991 | Allsop et al. | 280/281.1 |
| 5,076,601 | A | 12/1991 | Duplessis | 280/281.1 |
| 5,080,385 | A | 1/1992 | Duplessis | 280/281.1 |
| 5,093,162 | A | 3/1992 | Fenton et al. | 428/34.5 |
| 5,116,071 | A | 5/1992 | Calfee | 280/281.1 |
| 5,122,210 | A | 6/1992 | Kubomura et al. | 156/78 |
| 5,143,665 | A | 9/1992 | Clubbs et al. | 264/221 |
| 5,152,543 | A | 10/1992 | Sims et al. | 280/250.1 |
| 5,160,682 | A | 11/1992 | Calfee | 264/161 |
| 5,188,384 | A | 2/1993 | van Raemdonck | 280/281.1 |
| 5,215,322 | A | 6/1993 | Enders | 280/231 |
| 5,217,555 | A | 6/1993 | Franklin, III et al. | 156/156 |
| 5,262,118 | A | 11/1993 | Fukushima et al. | 264/258 |
| 5,271,784 | A | 12/1993 | Chen et al. | 156/156 |
| 5,273,303 | A | 12/1993 | Hornzee-Jones | 280/281.3 |
| 5,314,653 | A | 5/1994 | Haralambopoulos | 264/310 |
| 5,318,742 | A | 6/1994 | You | 264/516 |
| 5,344,237 | A | 9/1994 | Takei et al. | 384/45 |
| 5,368,804 | A | 11/1994 | Hwang et al. | 264/258 |
| 5,415,423 | A | 5/1995 | Alllsop et al. | 280/281.1 |
| 5,423,564 | A | 6/1995 | Harvey | 280/281.1 |
| 5,456,481 | A | 10/1995 | Alsop et al. | 280/281.1 |
| 5,505,492 | A | 4/1996 | Nelson et al. | 280/819 |
| 5,544,907 | A | 8/1996 | Lin et al. | 280/288.3 |
| 5,597,630 | A * | 1/1997 | Hogarth et al. | 428/36.1 |
| 5,624,519 | A | 4/1997 | Nelson et al. | 156/245 |
| 5,803,476 | A * | 9/1998 | Olson et al. | 280/281.1 |
| 5,814,268 | A * | 9/1998 | Banchelin et al. | 264/516 |

* cited by examiner

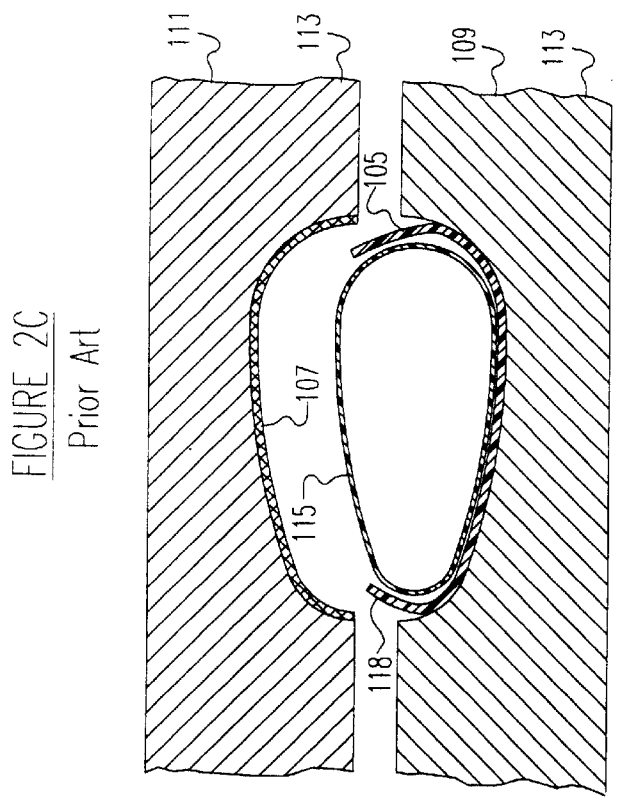
FIGURE 2C
Prior Art
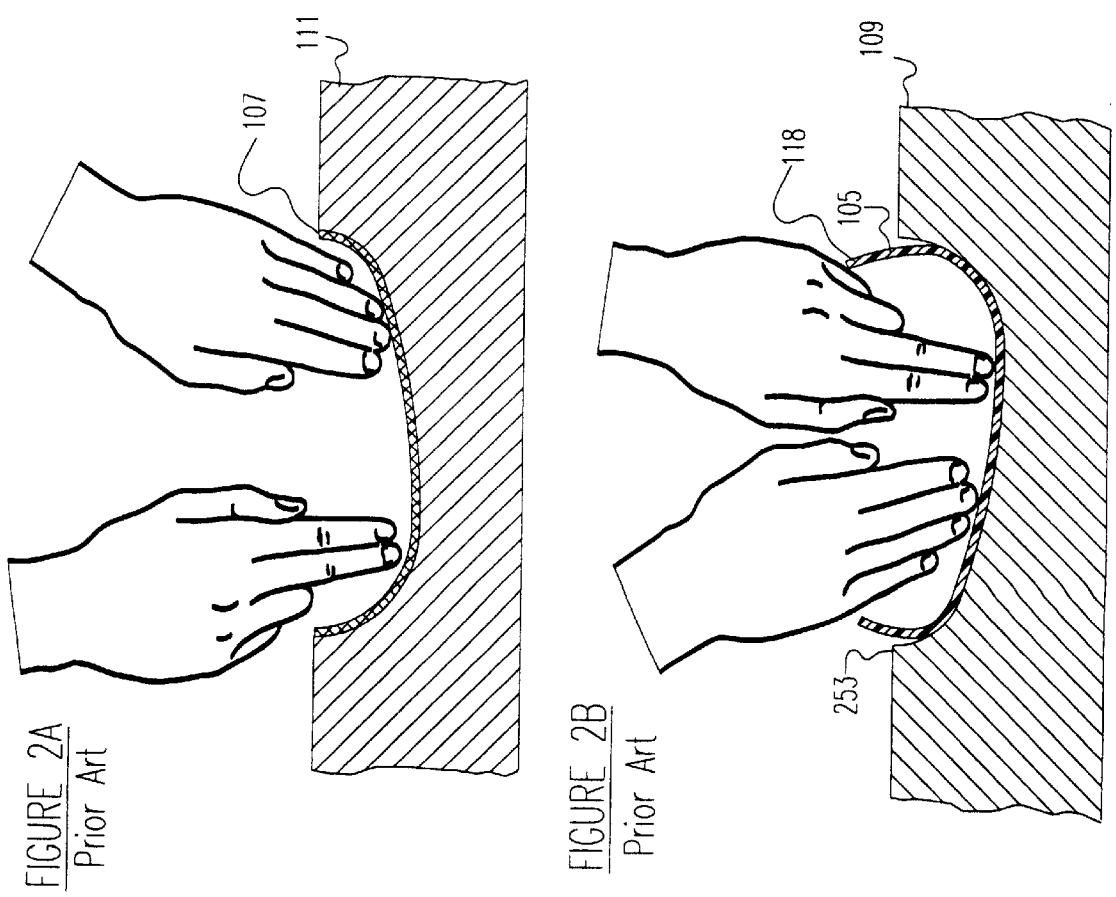
FIGURE 2A
Prior Art
FIGURE 2B
Prior Art

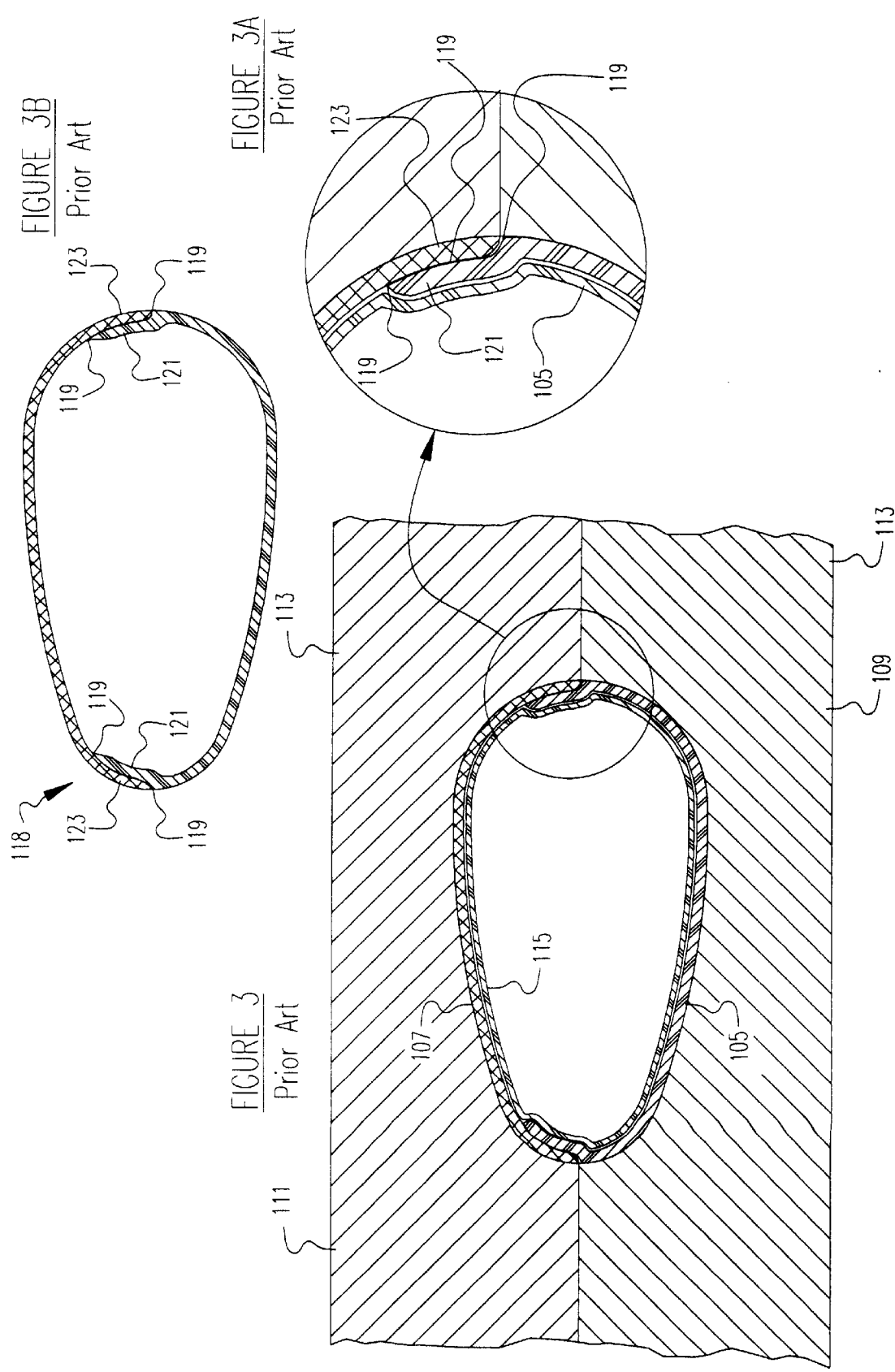

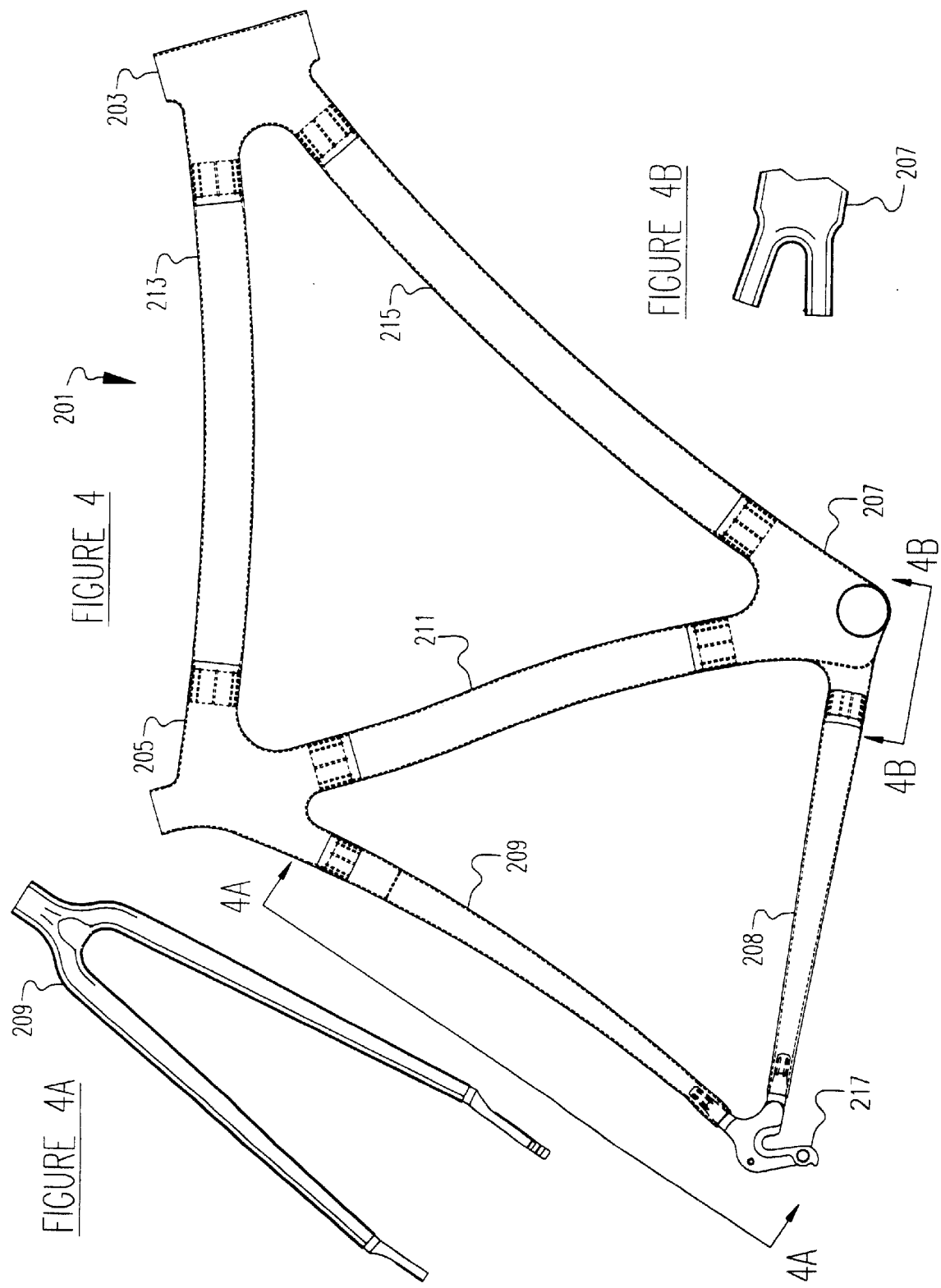

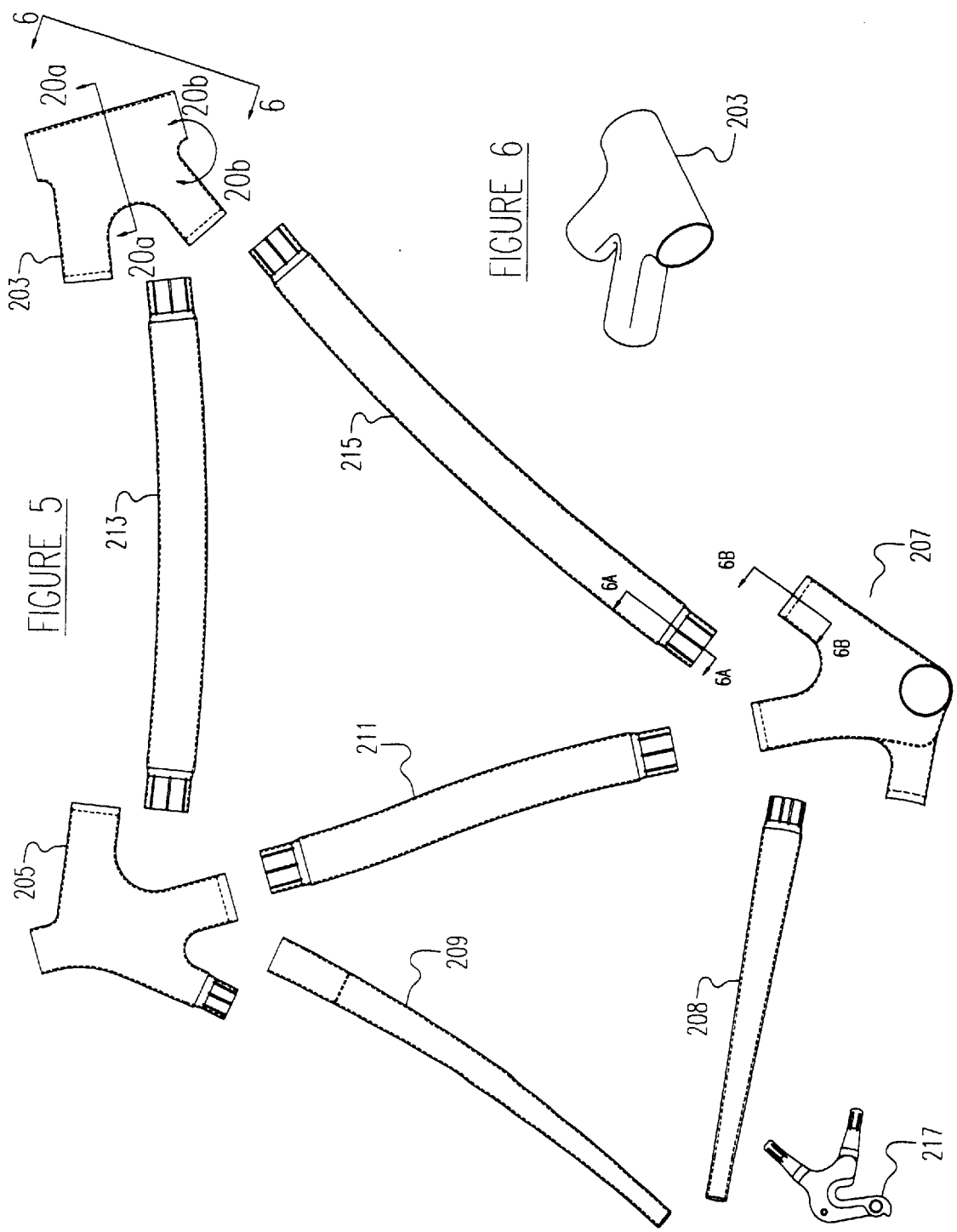

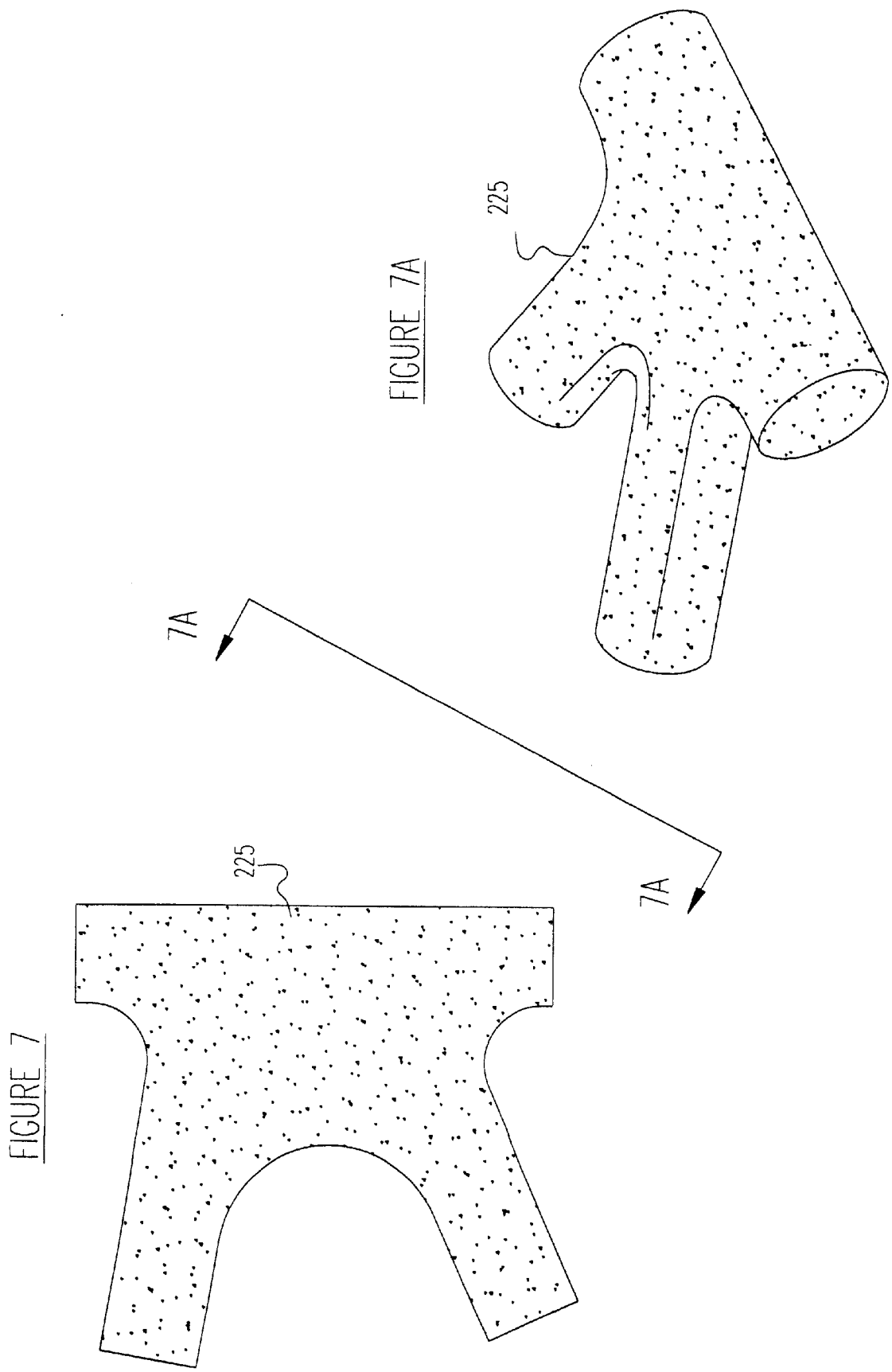

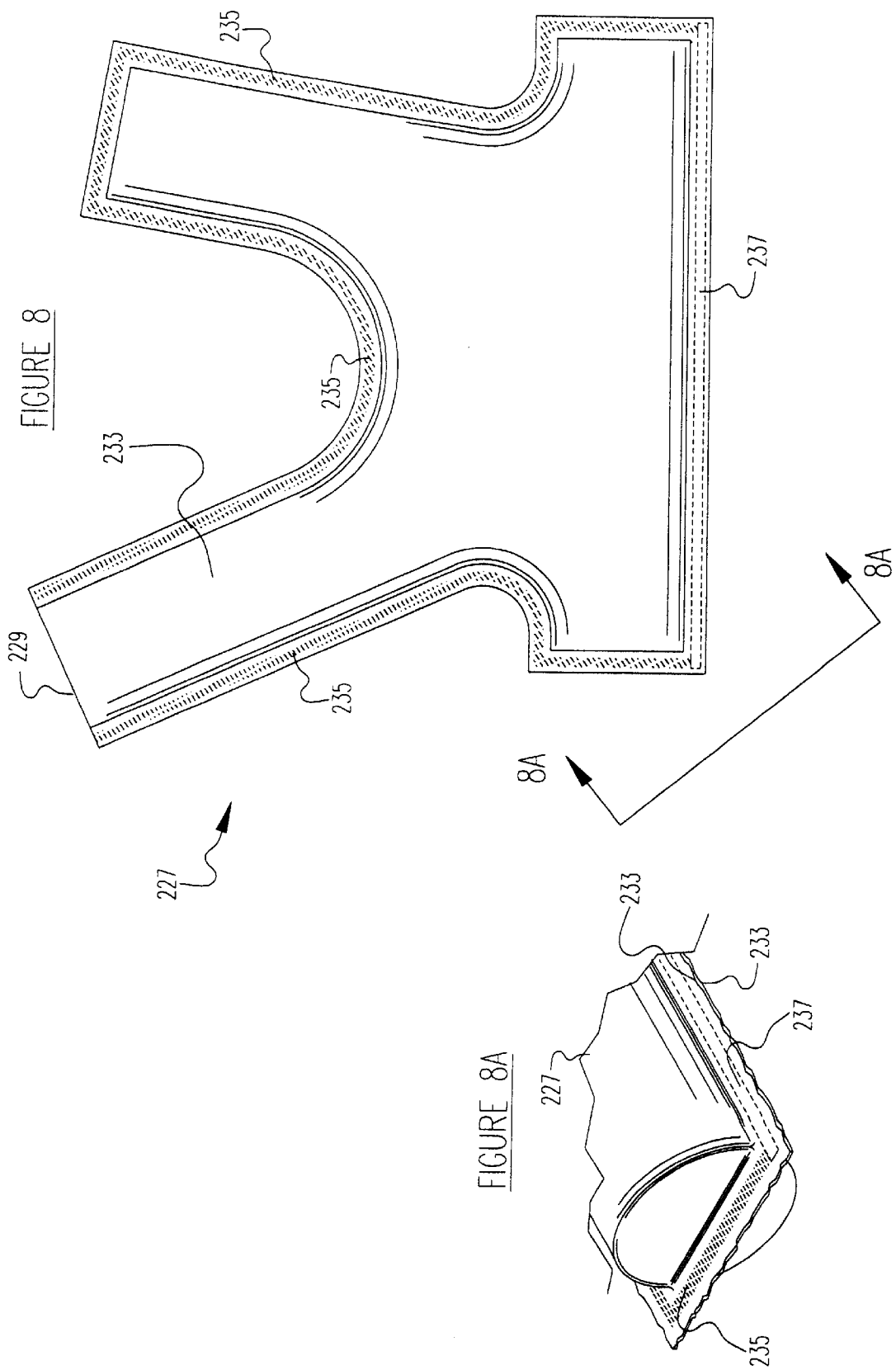

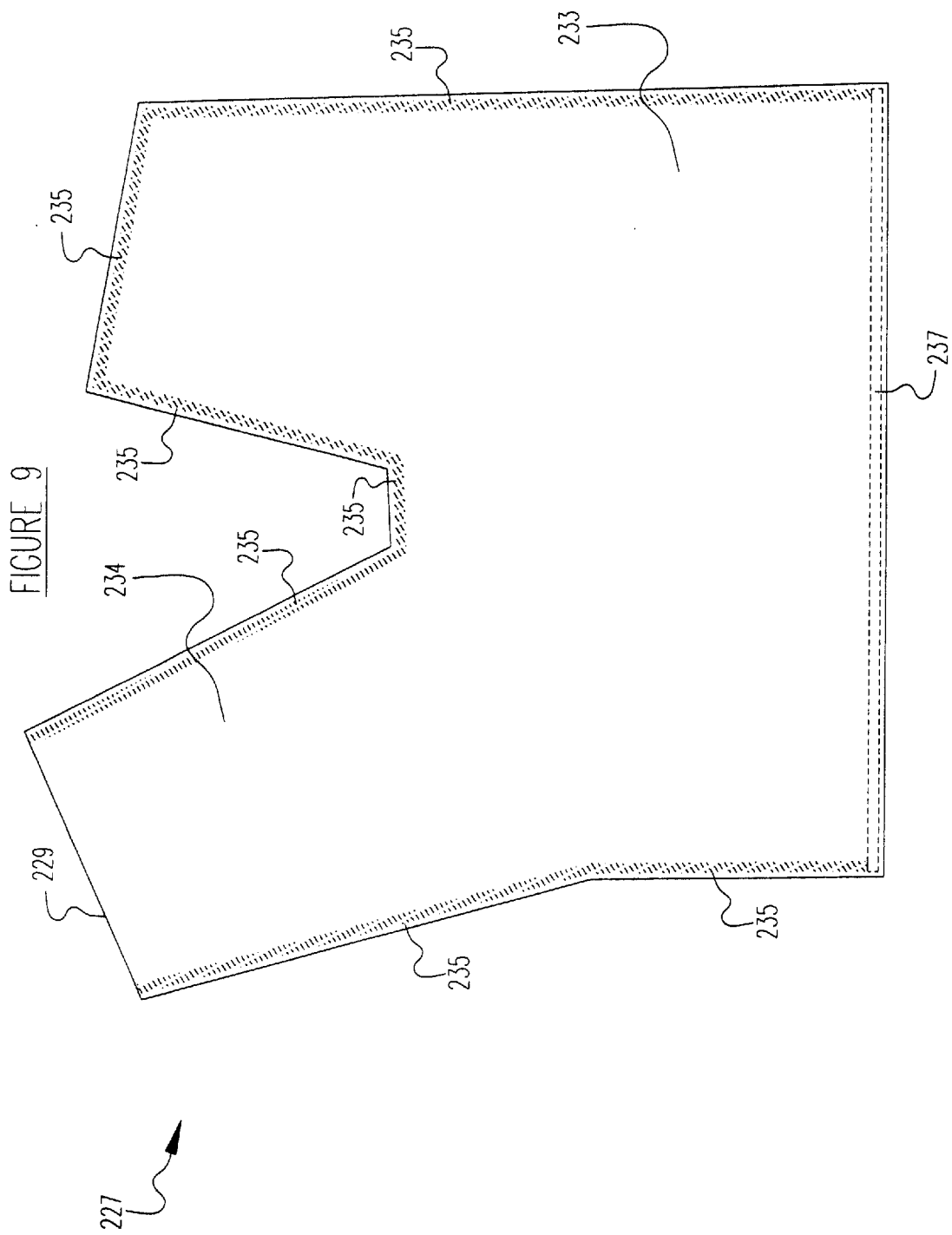

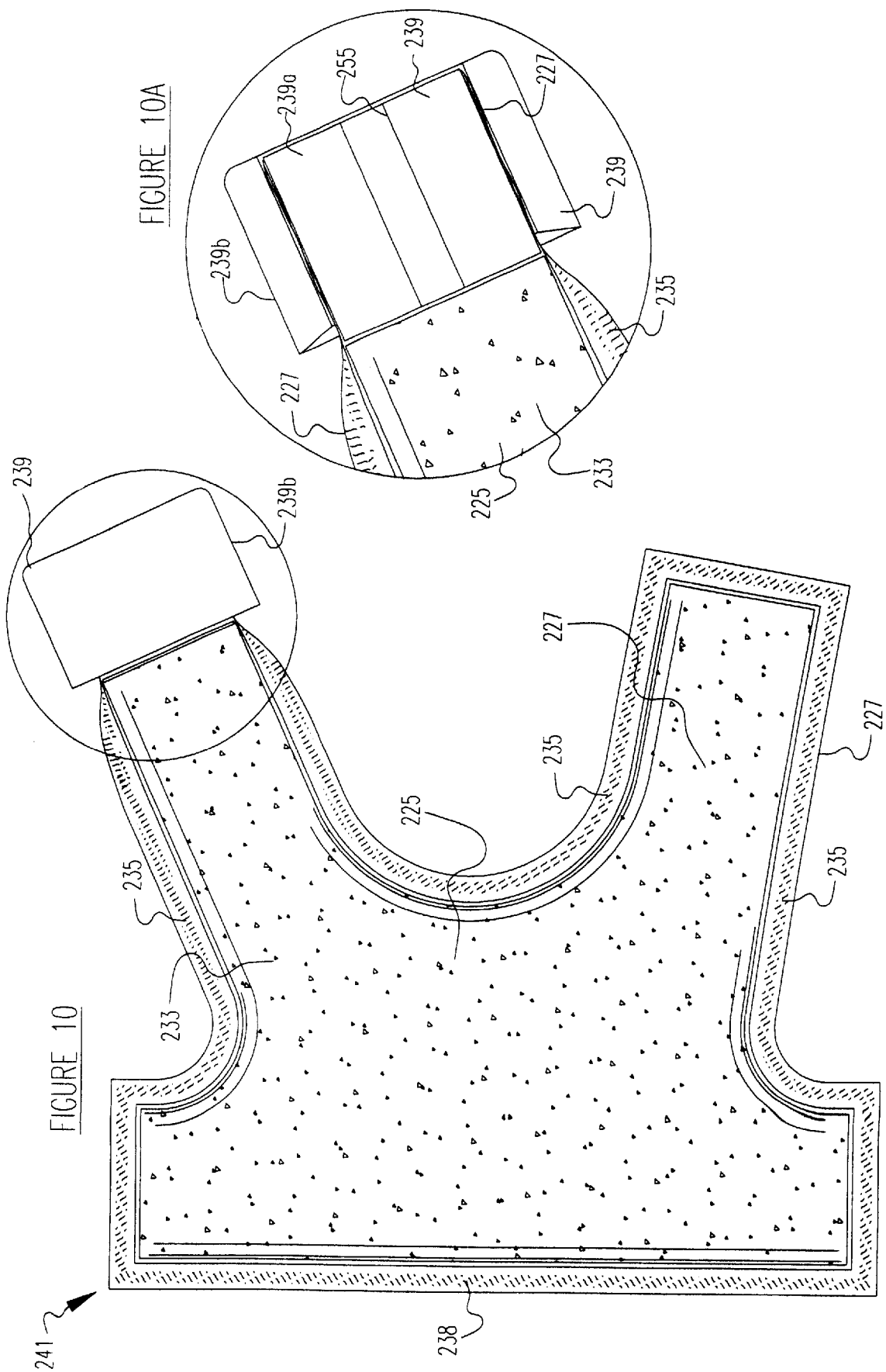

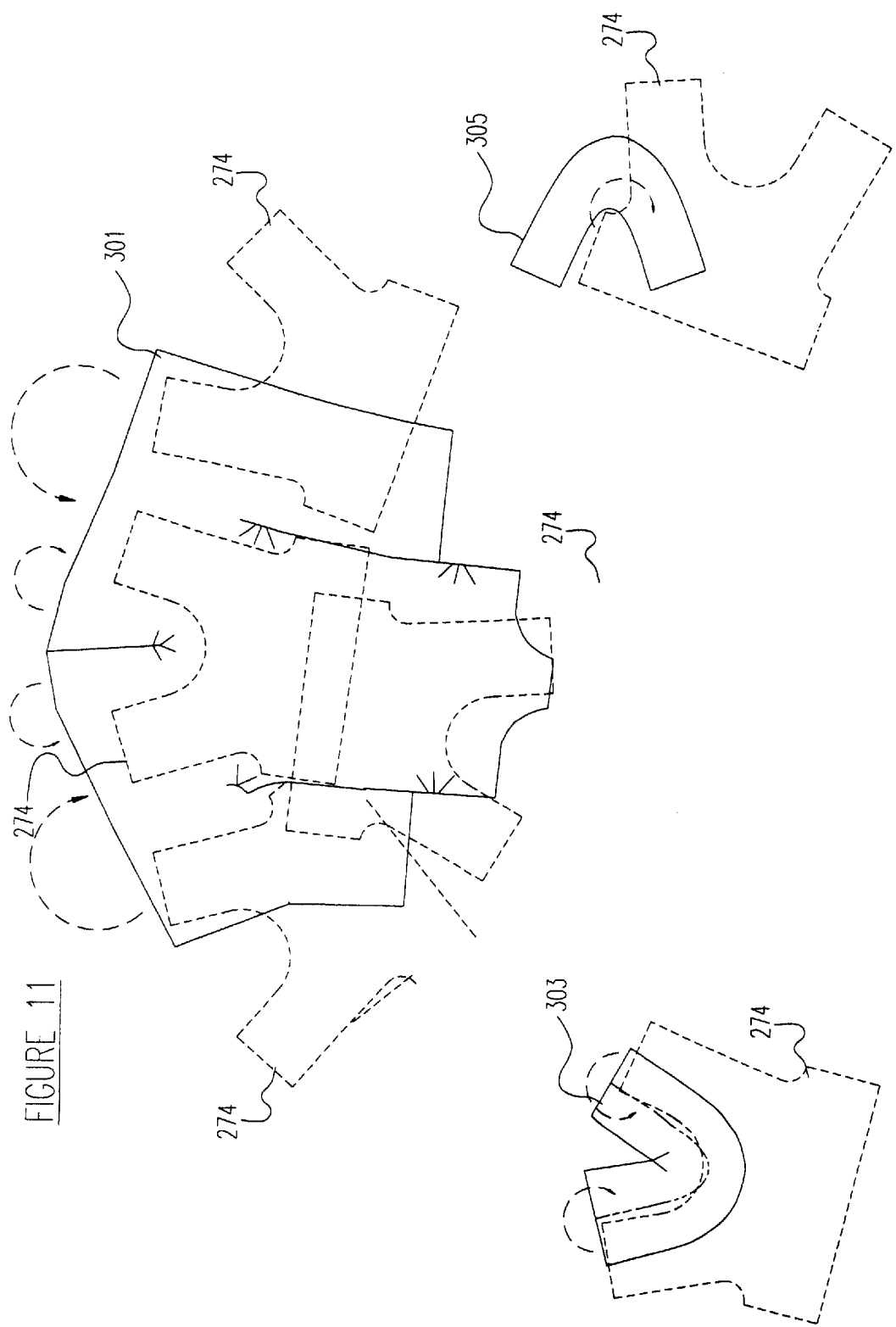

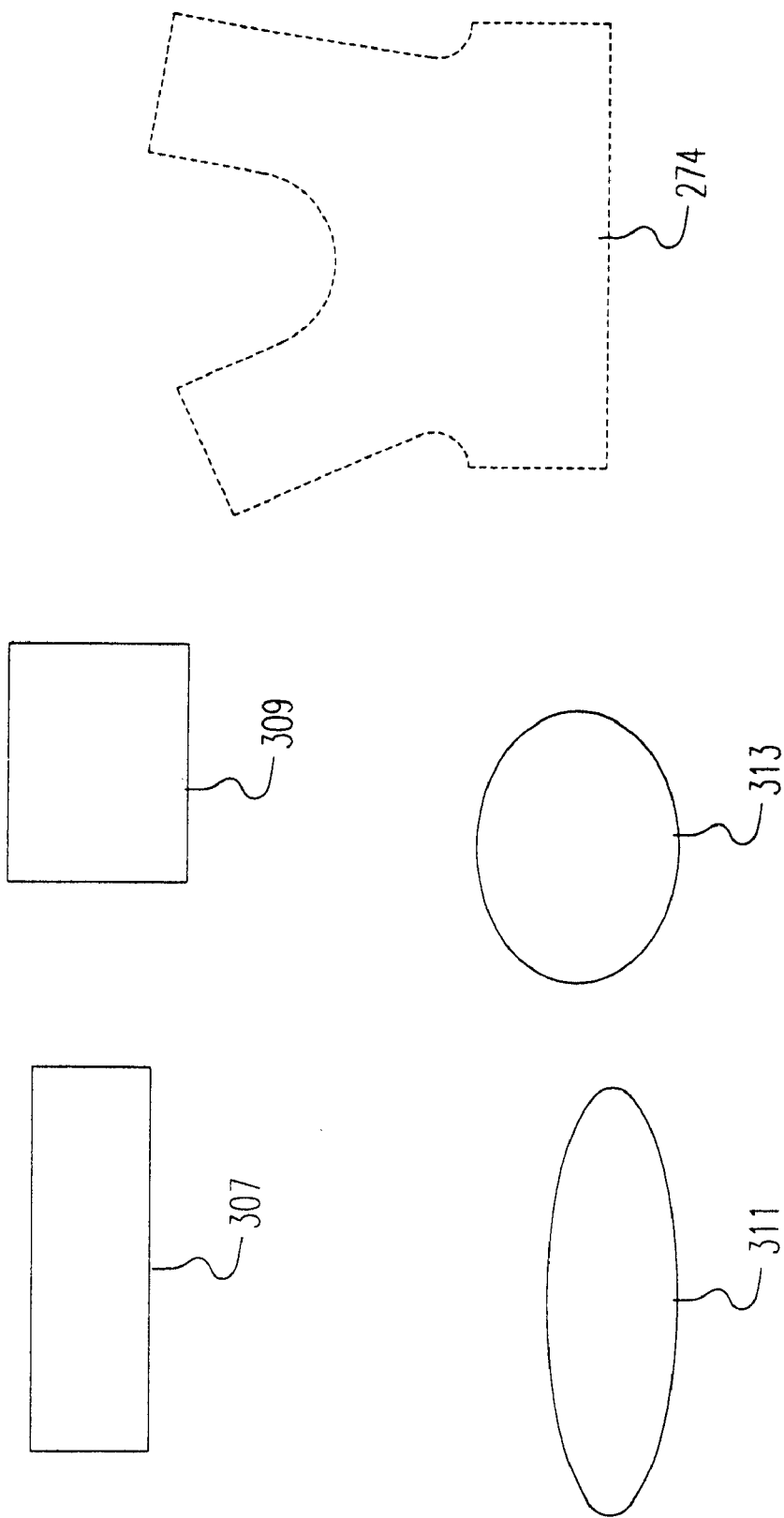

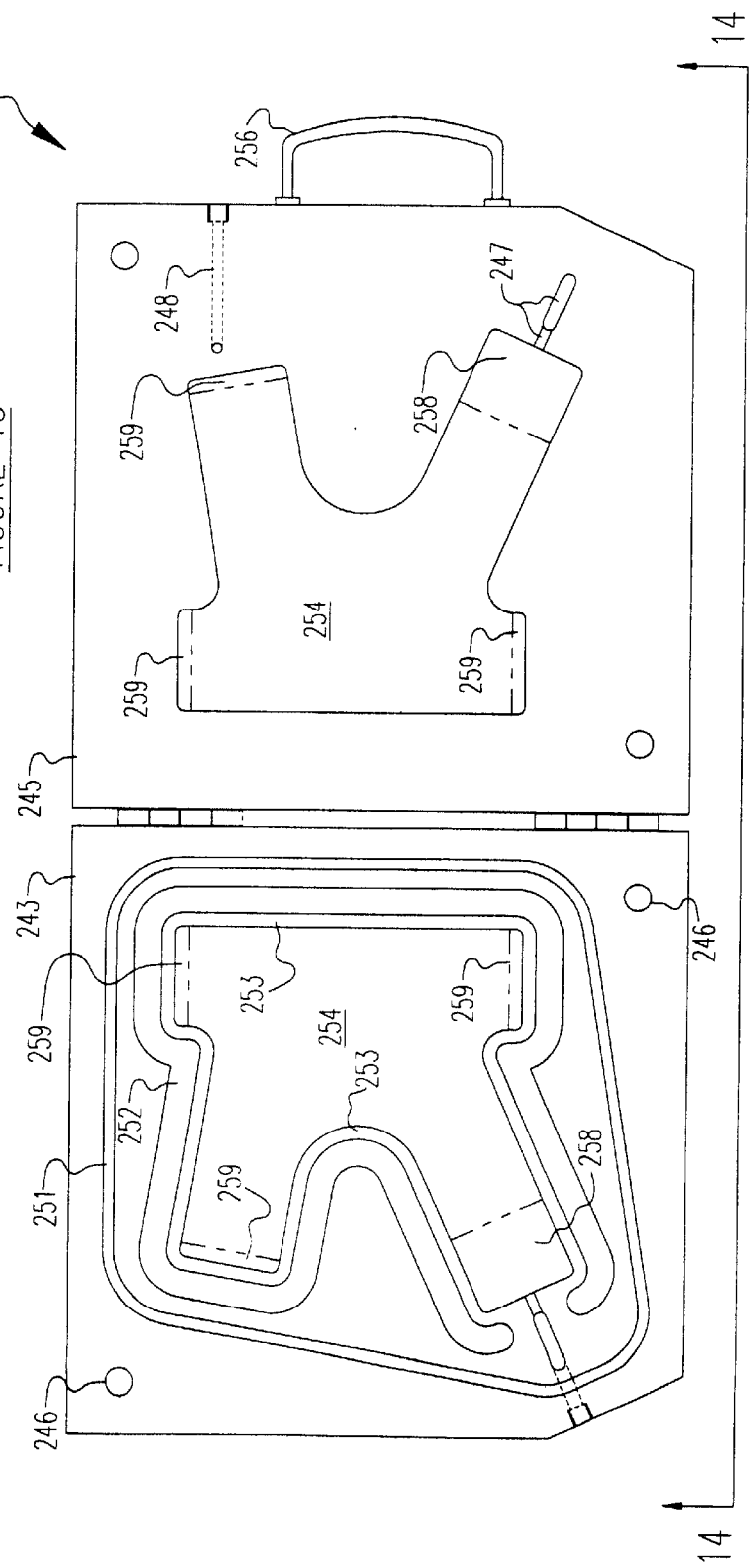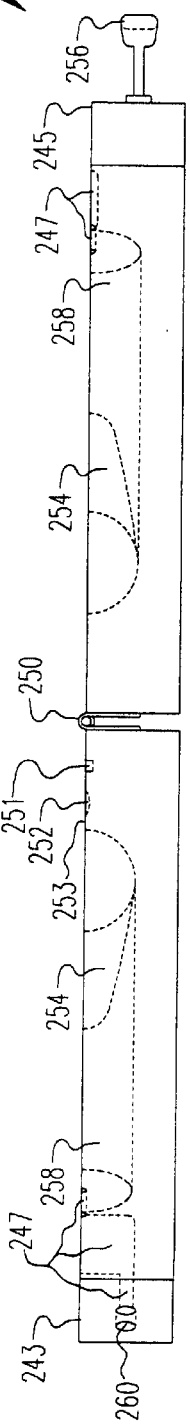

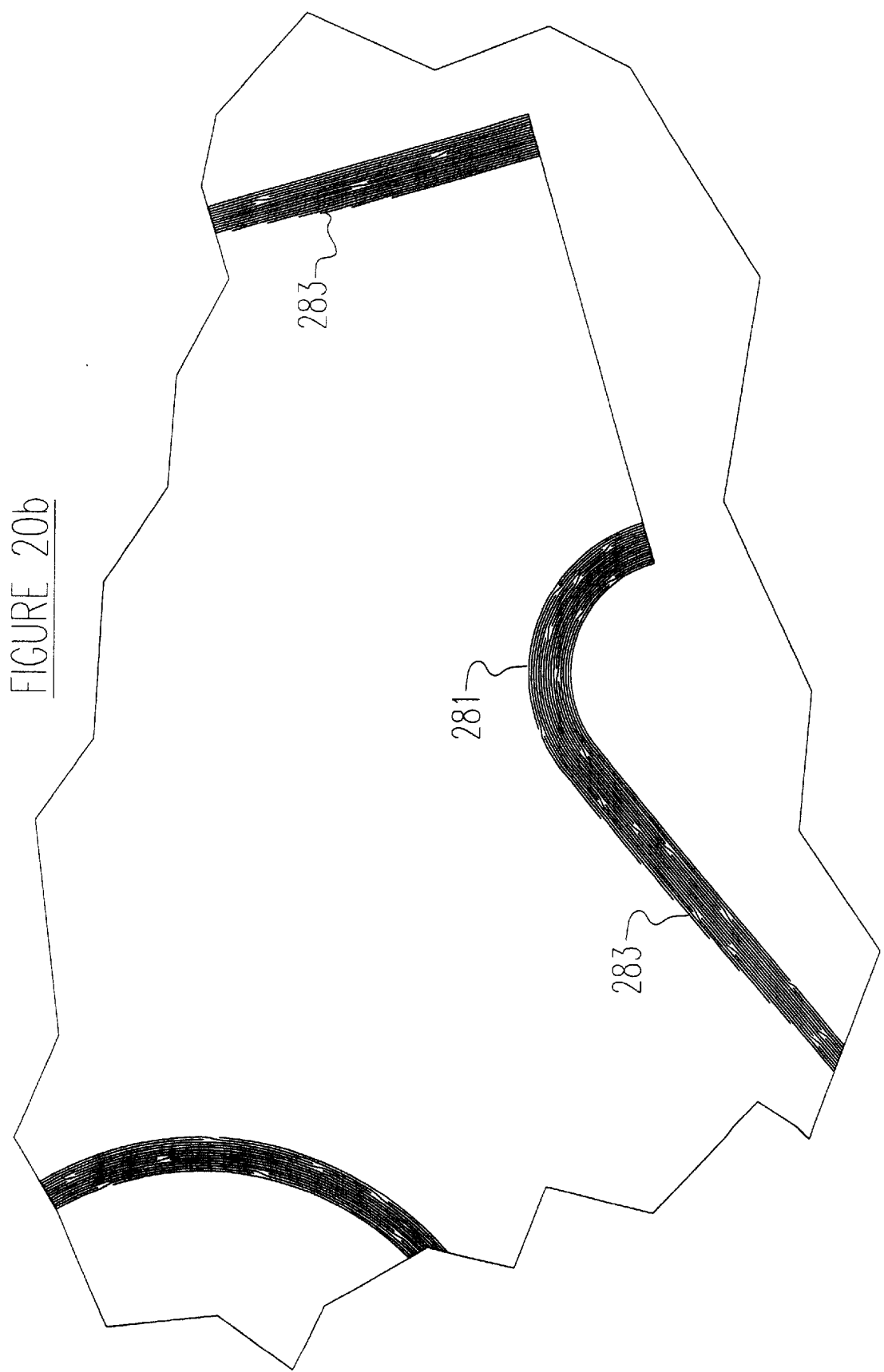

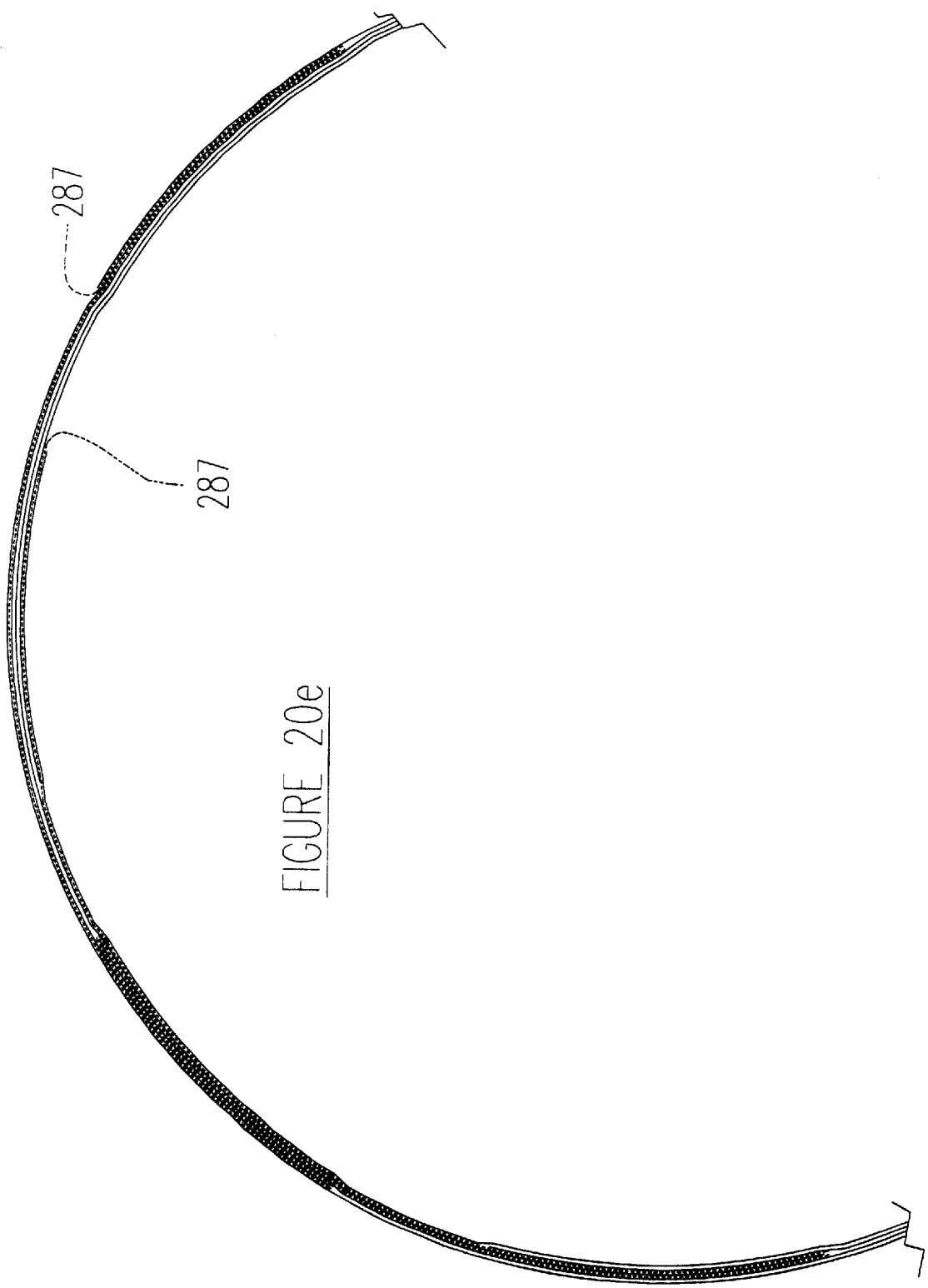

COMPOSITE BICYCLE FRAME AND METHOD OF CONSTRUCTION THEREOF

RELATED APPLICATIONS

This application is a continuation-in-part of U.S. patent application Ser. No. 08/839,110, now U.S. Pat. No. 5,985, 197, titled "COMPOSITE GOLF CLUB HEAD AND METHOD", filed Apr. 23, 1997, by Nelson et al.

STATEMENT REGARDING FEDERALLY SPONSORED RESEARCH OR DEVELOPMENT (Not applicable)

FIELD OF THE INVENTION

This invention relates to bicycle frames. It is particularly related to light weight, very strong bicycle frames made of composite materials.

BACKGROUND OF THE INVENTION

Discussion of Prior Art.
Traditional Metal Bicycle Frame

Bicycle frames have traditionally been constructed of assembled metal tubes. A variety of methods have been used to connect the metal tubes. The most common methods have included welding, soldering or brazing. It has also been common to use preformed metal lugs as connectors at the junctions of the metal tubes. The preformed lugs reinforce, or add strength and stiffness to the welded, soldered, or brazed joint.

Bicycle Frames Utilizing Advanced Composite Tubes

Some modern bicycle frames utilize composite materials to increase the strength and stiffness of the frames, while reducing frame weight, relative to traditional metal frames. Composite materials have a lower density, higher specific strength and stiffness, and better damping qualities than traditionally used metals. The most common method of joining composite tubes to each other has been to use metal lugs at the joints and bonding of the composite tubes to the metal lugs. The metal lugs generally weigh more than the composite tubes to which they are bonded. If the metal lugs are reduced in size to reduce weight there must be a corresponding reduction in size of the composite tubes, with corresponding loss of strength of the frame. Since weight reduction and strength are of primary importance, the use of a combination of composite tubes metal lugs has not been entirely satisfactory.

Previous Jointed All Composite Frames

Several methods have been developed to produce an all-composite bicycle frame. One typical method involves secondarily joining precured composite tubes to each other in the desired frame configuration. Composite tubes are joined to each other by first cutting the tubes, trimming or mitering the tube ends and wrapping uncured composite materials around and between the ends and formed cuts of the tubes to be connected and then curing the composite materials, in place, to form a connection between the tubes. See U.S. Pat. Nos. 5,188,384 to van Raimdonck, 5,106,682 and 5,116,071 to Caffee, 4,900,048 to Derjinsky, and 5,019, 312 to Bishop. The connection between composite tubes are generally solid and the resultant frame is not hollow throughout. The uncured composite material used becomes a reinforcing material laid over and placed into and between the tube members. Parasitic material, which is generally unreinforced resin containing no fillers to control its viscosity and to reduce its density, is also used to insure acceptable cosmetic appearance of the assembled frames. The parasitic material is used to fill gaps and voids and then must be smoothed to give a desirable appearance to the frame. Frames made according to these known processes are not generally amenable to mass production, primarily due to the amount of manual labor required at each stage of the manufacturing process. Consequently, the frames are not commercially viable.

Another method for forming an all composite jointed frame uses lugs formed of composite materials using a bladder. In this method, disclosed in U.S. Pat. No. 5,624,519 to Nelson et al., bicycle lugs are formed by inserting preforms of stacked resin impregnated carbon fiber plies into respective halves of female tooling. A bladder is then placed over one of the preforms and the mold is closed. The bladder is then inflated to press the preforms against the tooling, and the mold heated to cure the resin to form the final cured lug. The preforms are sized so that each forms one half of the lug plus an overlapping portion that forms a lap edge. Accordingly, lugs manufactured by this process have dividing lines of overlapping cured composites. These dividing lines of overlapping composites provide weakness areas in the lugs and undesirable increased weight.

Trend Towards Elimination of Joints in All-Composite Frames

The joints in bicycle frames greatly influence the design, construction and performance of the frames. Joints between frame members are the most frequent source of structural problems occurring in bicycle frames. This is because internal structural loads are generally the greatest at the joints, and because it is difficult to bond the different materials at the joints. As a result, a number of proposals have been made to eliminate or greatly reduce the number of joints in the frames, through the greater use of composite materials. See U.S. Pat. Nos. 5,271,784 to Chen et al., 3,375,024 to Bowden, 3,833,242 to Thompson, 4,015,854 to Ramond, 4,230,332 to Porsche, 4,493,749 to Brezina, and 4,986,949 to Trimble.

Jointless All-Composite Bicycle Frames

High performance composite materials, such as carbon fiber with epoxy resin, have allowed the development of high performance bicycle frames made without any joints, or a reduced number of joints. In U.S. Pat. Nos. 4,828,781 to Duplesis, 5,544,907 to Lin et al. 5,368,804 to Hwang et al., 5,273,303 to Hornzee-Jones, and 4,986,949 to Trimble are disclosed methods for forming bicycle frames from carbon fiber/carbon composite materials without any joints, or a reduced number of joints. While these frames are successful to the large extent, there are many practical concerns, and manufacturing problems relating to the complexity of forming the entire bicycle frame in one step. In addition, the frames have a lapped construction, i.e., wherein two halves of overlapping materials form a lapped joint.

Three Dimensional vs. Two Dimensional

In the prior-art, parts that are simple three-dimensional shapes, often referred to as "two-dimensional" because they can be defined by a two-dimensional plane rotated about an axis, such as tubes, or a two dimensional shaped traveled along a line, such as rectilinear solid have been made. As illustrated, for example in the U.S. Pat. 4,828,781, tubes in particular have been made without seams by various processes by wrapping resin impregnated fiber into tubes and curing the tubes under pressure applied externally or by an internal bladder. However, complex three-dimensional shapes, such as lugs, one piece frames, or other large frame sections, have been formed by overlapping fiber preforms to form a lapped joint because the methods for forming tubes and the like cannot be applied to complex three-dimensional shapes. This lapped joint not only introduces a potential weakness to the part, but requires additional material for the lap. In addition, this lap construction method may require additional reinforcing material in the lap area, which adds more weight to the final part.

Another problem with prior-art methods for forming complex three-dimensional parts is that a preform for each mold half must be dimensioned specifically to fit into the part cavity. This requires that each preform must be a large flat piece that when pressed into the mold cavity must distort and is likely to fold. These folds are a source of weakness and cracks in the final part and can lead to failure of the part. The folds can also result in resin pockets, pin-holes, and other visual and structural defects. The constraint to shape the preform for the mold also limits the possibility of designing the preforms specifically for performance and strength.

OBJECTS OF THE INVENTION

It is a principal object of the present invention to provide an all composite bicycle frame, wherein the entire frame or three dimensional components of the frame are lapless, thus avoiding the extra weight and strength reduction inherent in lapped construction.

It is another object of the invention to provide an all composite frame that has a low frame weight and high frame strength and stiffness.

Another object of the invention is to provide a method of producing a composite bicycle frame that includes making strong, hollow connector lugs suitable for interconnection of composite tubes.

Another object of the invention is to provide a lapless construction for complex three-dimensional parts, which allows easier formation of sockets for receiving other parts.

Another object of the invention is to provide a method for forming a complex three-dimensional composite part that is not constrained to specific preform shapes.

Another object of the invention is to provide a method for forming composite parts that has faster cycle times by eliminating the need for an operator to lay up preforms for the part in the mold, which allows the mold to be run hot and eliminates the time for lay up in the mold.

Another object of the invention is to provide a method for forming composite parts which reduces tool wear from material being caught between tool halves.

Another object of the invention is to provide a method for forming composite parts, wherein there is no constraint to dimension the preform for laying up in the mold.

SUMMARY OF THE INVENTION

Parts for three-dimensional composite bicycle components and frames of the invention are molded using matched female tooling conforming to the exterior shape of the part, with an internal pressurization system. A soluble or removable mandrel core conforming essentially to the interior of the part to be molded is formed from a foam material that remains soluble after the molding process. A sealed bladder, conforming generally to the shape of the desired lug to be produced, is placed around the soluble foam mandrel core. A bladder fitting is fitted to the sealed bladder such that the bladder fitting provides a path for air injection and bladder inflation. Layers of uncured composite material are usually laid in a piecewise fashion to create a covering of interleaving plies on the surface of the bladder. It is a relatively easy matter to place and hold the uncured layers of composite material on the bladder, since the soluble foam core functions as a support mandrel, and usually only one or two plies are laid up at a time.

The assembly comprising the soluble foam mandrel core, the sealed bladder, bladder inflation fitting, and the uncured composite material is placed in the female mold, with the bladder fitting attached to a suitable inflation fitting in the mold. The bladder is inflated through the bladder fitting to apply the necessary pressure to force the laid-up composite material against the cavity walls. The mold is then heated to the temperature necessary to cure the composite material. After the composite material has cured, the mold is opened, the cured part is removed, and the bladder fitting extracted from the cured part.

In a preferred embodiment, water or other suitable solvent solution is injected into the interior of the bladder to dissolve and wash out the soluble foam material. The water or solvent may be introduced through any suitable opening in the part, such as the opening left after removal of the bladder fitting. The soluble foam material of the mandrel core is used only for formation of the uncured preform of uncured resin composite, and it is not used in the actual molding process. Therefore, the strength and heat resistance of the foam is not critical during molding. Since the foam mandrel core does not have to withstand the pressure and temperature molding conditions, it may be made of materials that are structurally weak and unable to withstand elevated molding pressures and temperatures. This allows the use of materials that are completely unsuitable as removable molding cores used in some prior-art molding systems. Thus, a material, such as starch, functions as a suitable support for lay up of the plies and can be easily removed by dissolving with a readily available and non-toxic solvent, water.

The bladder is made of a heat resistant plastic that does not melt or react with or bond to the interior of the molded part. Thus, it can become separated therefrom and easily removed, along with any small residue of the foam core that may be within bladder. In the preferred embodiment of this invention, the bladder consists of a thin film, that comprises only a small volume of material. The film bladder can then be removed by pulling it out of even a small opening in the molded part. Additionally the thin film bladder itself can be a soluble plastic, preferably water soluble, such as polyvinyl alcohol (PVA) film. The use of easily soluble bladder films is advantageous where extremely small openings are used for inflation during molding and subsequent removal of the bladder. Soluble films are also used if molding of very complex features on the inside of the part might inhibit removal of the bladder. Such complexities might involve cocured metallic features inside the part.

After removal of the bladder and core, the completed part is trimmed if necessary. For example, the tube connector ends of a formed bicycle lug may be trimmed to have an entirely hollow, formed lug that will extend into and be bonded to hollow tubes to make up a fully composite bicycle frame. The formed bicycle lug may also form the receptacle into which the hollow tube can be inserted into and bonded to form an entirely composite bicycle frame. Other frame parts or complete frames may be also trimmed for attachment of metal or other composite components.

A summary of the steps for one of the preferred methods for producing bicycle frame components of this invention are listed below:

Step Description

1. Form a foam mandrel core which is used inside bladder for composite material lay up process.

2. Form and seal a bladder around the mandrel core and attach a bladder fitting to create the bladder/core/fitting assembly.
3. Place uncured fiber resin prepreg material on bladder/core/fitting assembly.
4. Place uncured fiber resin prepreg assembly containing bladder/core/fitting assembly into a female mold defining the outer contours of the final component.
5. Apply pressure to bladder through the bladder fitting to compact uncured fiber resin prepreg component while optionally applying vacuum in mold cavity to remove entrapped air while heating mold and prepreg to cure the plastic resin.
6. Remove cured part, which still contains the bladder/core/fitting assembly, from the female mold.
7. Remove the bladder fitting from the bladder/core/fitting assembly.
8. Introduce water into bladder/core, which is still inside component, to wash out the foam mandrel core from inside the bladder.
9. Remove the bladder from inside the cured part, by pulling it out of hole through which the inflation fitting extended, or any other suitable hole. In the case of the head lug and other lugs there may be multiple holes.
10. If required, trim the excess cured composite material. The part may be machined to create a bonding surface for attachment of additional parts or tubes.
11. Part is now ready for bonding to another part, such as a composite tube if the part is a frame lug.

BRIEF DESCRIPTION OF DRAWINGS

FIGS. 2A, 2B, and 2C are schematic diagrams illustrating a process of the prior art.

FIGS. 3, 3A, 3B are schematic diagrams illustrating a process of the prior art, showing particularly the lapped construction.

FIGS. 4, 4A and 4B are views of a hollow composite frame of the invention.

FIG. 5 is an exploded view of the frame of FIG. 4.

FIG. 6 is a view of the head tube lug of the frame in FIG. 5.

FIGS. 7 and 7A show a mandrel core used in the process of the invention.

FIGS. 8 and 8A show a vacuum formed bladder used in the process of the invention.

FIG. 9 shows a flat sheet bladder used in the process of the invention.

FIGS. 10 and 10A shows the mandrel core of FIG. 7 in the bladder of FIG. 8 with a bladder fitting.

FIG. 10A is a detail of the bladder fitting in FIG. 10.

FIGS. 11 and 12 are diagrams of preforms used in the process of the invention.

FIGS. 13 and 14 show a female mold used in the process of the invention for making a lug as in FIG. 6.

FIGS. 20A and 20B are a cross-sections of the finished cured part.

FIGS. 20C, 20D and 20E are cross-sectional views illustrating a part of the invention.

LIST OF REFERENCE NUMERALS

Figure 1:
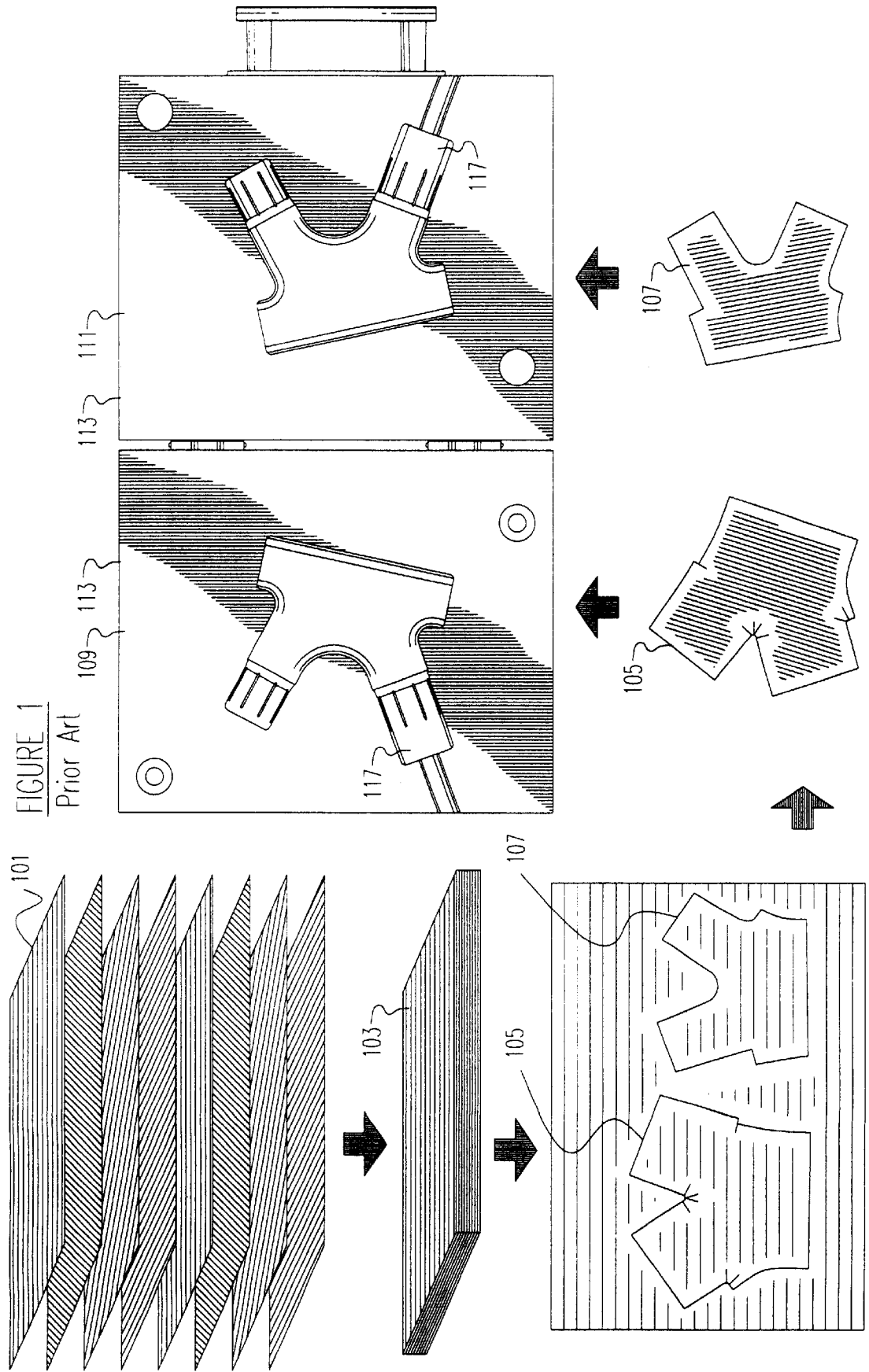
FIG. 1 is a schematic flow sheet showing a process of the prior art.

Depiction of Prior-art
Number Name
101 individual plies of resin impregnated fiber.
103 individual plies formed into a prearranged stack
105 preform cut to go into the bottom mold half
107 preform cut to go into the top mold half
109 bottom half of a female mold
111 top half of female mold
113 female mold
115 bladder
117 cavity for inflation fitting
118 overlapping portion of preform
119 the main seam in a "lapped joint"
121 "lap" portion of a lap joint, i.e. the inner plies of lap joint.
123 outer half of (outside plies) of lap joint
124 tube end part of a lug made with prior art lapped construction
127 "lap" material which would be removed to form a socket

DEPICTION OF THE INVENTION 201 jointed or "lugged" tubular bicycle frame
203 head tube lug
205 seat tube lug
207 bottom bracket lug
208 chain stay tube
209 seat stay member
211 seat tube
213 top tube
215 down tube
217 metallic drop out
219 plug on down tube
221 socket in bottom bracket lug to accept down tube plug
225 mandrel core
227 flexible bladder
229 inflation fitting opening in bladder
233 thin film sheets of a thermally vacuum formed bladder
234 thin film sheets of a bladder made from flat film not thermally vacuum formed
235 initial heat seals made on bladder prior to insertion of mandrel core 237 area delimited on bladder for final heat seal after mandrel core/s have been inserted in bladder
238 final heat seal on bladder made on bladder after mandrel core/s have been inserted
239 bladder fitting
239a bladder fitting inner sleeve
239b bladder fitting outer sleeve
241 assembly of mandrel core, bladder and bladder fitting
242 mold set
243 mold bottom half
244 wrapped assembly of mandrel core, bladder and bladder fitting
245 mold top half
246 alignment pin
247 cavities in mold pieces for inflation fitting passage
248 vacuum fitting connection and passage in mold
249 inflation fitting
250 hinge
249a compression fitting portion of inflation fitting
249b copper tube portion of inflation fitting
249c barbed fitting portion of inflation fitting
O-ring grooves
252 resin "flash" cavity in mold for overflow or bleed of resin from prepreg material
253 pinch landing on mold face
254 mold part cavity
255 hole in bladder fitting
256 mold handle
257 O-ring in mold
258 bladder fitting portion of mold cavity
259 part tag end area of mold part cavity
260 mold inflation fitting connection area to mold for vacuum seal
261 hole left by bladder fitting
263 interior of head tube lug
265 as molded head tube lug
267 untrimmed, tag end edges of part, subsequently trimmed
269 water core flush hose
271 water
272 cross section of finished head lug
274 phantom depiction of head lug
281 typical ply termination in finished lug
283 typical ply drop off in finished lug
285 simplified cured part illustrating ply placement
287 path through wall of cured part
301 large complex shaped preform
303 main gusset reinforcement preform piece
305 rear head tube opening reinforcement preform piece
307 elongated rectangular standardized preform piece
309 squarish standardized preform piece
311 elongated elliptical standardized preform piece
313 roundish standardized preform piece
401 bicycle with tubular monocoque frame constructed with the means of the present invention
403 tubular monocoque frame
404a,b assembled mandrel core/bladder with final heat seal made for bladders a and b
405a,b bladders for tubular monocoque frame, a=upper frame portion bladder, b=lower frame portion bladder
407a,b initial heat seal lines for bladders a and b
409a,b aperture in bladders a and b
410c,d mandrel cores for bladder b, i.e. two part mandrel core
411a,b final heat seal lines on bladders a and b
412 mandrel core for bladder a
421 bicycle with high volume monocoque frame
423 high volume monocoque frame
425 bladder for high volume monocoque frame
427 initial heat seal lines
429 final heat seal fines
431a,b multiple mandrels for high volume monocoque frame
433 initial heat seal lines
435 final heat seal lines
501 . . . 508 ply layers in a part

DETAILED DESCRIPTION OF THE INVENTION

Comparative Discussion of the Prior-art

For some time it has been known to produce bicycle frames by interconnecting composite tubes with composite lugs. Composite lugs have been used to interconnect composite tubes and to make a entirely hollow bicycle frames. See U.S. Pat. 5,624,519, to Nelson, et al.

Reference is now made to FIG. 1, which is a schematic flow sheet of an illustrative prior-art method. In the prior-art, individual plies 101 of resin impregnated carbon fibers are assembled into a multi-ply stack 103. The multi-ply stack is cut to form two preforms 105, 107, which are then placed in the bottom 109 and top 111, respectively of a two-piece female mold 113.

Reference is now made to FIGS. 2A, 2B and 2C. In FIG. 2A, top preform 107 comprising layers of composite material is placed in the top mold half 111. In a similar manner in FIG. 2B, bottom preform 105 comprising layers of composite material is placed in the cavity of the bottom mold half 109. Referring to FIG. 2C, a preformed bladder 115, is then placed in the bottom mold part 109, and the mold is closed by inverting the top mold half 111 and aligning and placing it over the bottom mold 109, as shown the FIG. 2C. When placed into respective mold halves, the top and bottom preforms 105, 107 are warmed, usually be heating the tool, to the make them more pliable, and are pressed into the mold 113 to generally conform with the contours of the mold. The top preform 107 is a net side preform, i.e., is net-shaped or dimensioned to just fit into the top mold half and extend to the edges of the mold part cavity. The bottom preform 105 lap side preform, i.e., is made oversized, so that when the mold halves 109 & 111 are assembled, the preforms 105 & 107 will overlap at their edges. The overlaps 118 are wrapped over the bladder 115 so that the edges are not caught between the mold halves when closed. The overlaps 118 may be stiffened by chilling to prevent them from losing their shape and springing out of the mold as the mold is assembled. An inflation fitting cavity 117 is provided in each mold half to accommodate a suitable fitting for inflating the bladder (not shown).

Reference is now made to FIGS. 3, 3A, and 3B. After the mold 113 is closed, the bladder 115 is inflated to compact the preforms 105 & 107 against the contours of the mold, and the mold heated to cure the resin in the preforms. Referring to FIG. 3A, at the parting lines of the mold halves 109 111, the preform halves 105 & 107 are lapped, forming a lap or seam connection 119 between the preform halves, which extends entirely around the part. The seam introduces weakness to the part, since the carbon fibers all terminate at or near the seam, and the part will tend to fail at the seam.

Since complex three-dimensional shapes have to be formed in parting molds, the preforms of resin preimpregnated fiber plies (prepreg) have to conform essentially to the shapes of the mold parts with the exception of some overlap on the lap side preform. Thus, in the prior-art, plies do not extend significantly over more than one mold surface. The cured part is essentially tow halves joined at a midplane seam. This inherently creates a seam in the final part at the parting line of the mold parts.

Two-dimensional or simple three-dimensional-shapes, as described earlier, may be formed with fibers extending continuously around the part, because of the simplicity of the geometry and other factors. For complex three dimensional shapes, this cannot be accomplished without great difficultly because the plies cannot be formed around a bladder and placed in the mold in a position similar to that in the final part. In addition, any prepreg material that extends above the parting plane of a mold half, such as overlap material, cannot by pressed into the mold when the preforms are initially placed into the mold. Accordingly, the overlap must be relatively short to prevent substantial movement and misplacement of this material during bladder inflation and to allow closure of mold. The result is a part with a seam or lap which connects two or more otherwise structurally distinct halves.

A seam can also be described as a complete discontinuity of carbon reinforcing fiber, derived from all of the carbon plies terminating at or near the same place on the part. Referring to FIGS. 3A and 3B, the seam 119 extends along a path from the end of the overlapping inner plies 121 through the lap to the end of the outer plies 123, with no reinforcing plies extending across the line. Thus, although each preform used to form the part comprises multiple plies of reinforcing fiber, none of the plies extend across the seam path.

The Invention

By process the present invention, a three dimension part can be made without seams or lap joints in the part. The shape of the preforms is not constrained by the dimensions of the mold, and plies can extend through any portion of the part, without any limitations derived from the mold dimensions. Basically, the initial shaping and placement of the part preform is not accomplished by the prior-art method of pressing it into a mold cavity. Since the shaping is done outside of the mold, there does not have to be any accommodation in the preform design to the closing of the mold and the positions of the parting lines in the mold. The cured parts formed by the process of the invention, are accordingly seamless.

Seamless means that plies of reinforcing carbon fiber from different portions of the part are interleaved. In one sense this means that edges of several adjacent plies do not necessarily terminate together. By interleaving the plies, there is no seam line in the part, i.e., no short path through the part wall across which carbon fibers do not pass. While not desired, there may be locations in the part in which edges of adjacent plies incidentally or intentionally terminate together. However, it is desired to design the shape the preforms to avoid such instances, in order maximize the amount of reinforcing fiber at each point in the part.

In another sense, "seamless" can be described in terms of the length of the shortest path that passes along any plane through the part and passes from the interior of the part to the exterior, without passing through any carbon fiber plies. In a lapped prior-art part, the path basically extends about 0.25 to 0.375 inches along the length of the lap in generally the same direction. The interleave ratio, the length of the path to the average thickness of the overlapping layers or plies, is typically only from 5 to 15. The interleave ratio is an indication of the strength of a joint. The shortness of the overlap and the thick layers with multiple plies result in a low interleave ratio.

In contrast, when the plies are interleaved in the parts of the invention, the path through the part is convoluted and doubles back in an opposite direction. In addition, the average thickness of overlapping ply layers, which are usually only one or two plies thick, is small. The result is an interleave ratio that is significantly higher than for the lapped joints of the prior art, i.e., greater than about 30, but more typically 100 or more.

Specific Examples of Complex Three-Dimensional Parts of the Invention

Reference is now made to FIGS. 4, 4A, 4B and 5, which are views of a tube and lug hollow bicycle frame 201. In FIG. 4, which shows the assembled bicycle frame, which comprises various complex three-dimensional parts, such as lugs 203, 205, 207, chain stays 208 and seat stay member 209. The complex three-dimensional parts are joined by tubes 211, 213, 215. The tubes may be straight or curved, as shown in the Figures. More specifically, referring to FIG. 5, the frame 201 comprises a head tube lug 203 (also shown as a top view in FIG. 6), seat tube lug 205, and bottom bracket lug 207 joined by seat tube 211, top tube 213, and down tube 215. A metallic drop out 217 is joined to the seat tube lug 205 and bottom bracket lug 207 by the seat stay member 209, and chain stay members 208, respectively.

Figure 6A:
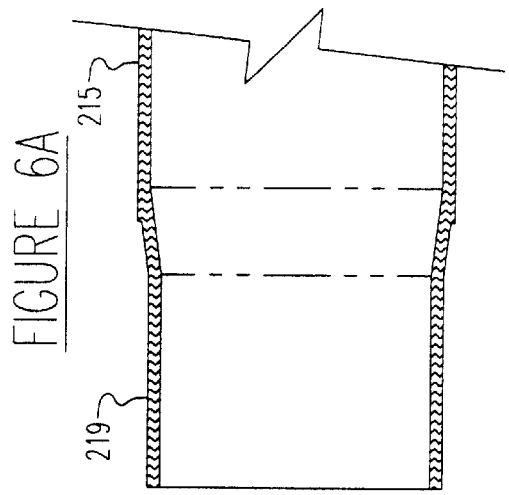
FIGS. 6A and 6B are detail views of the tube plug and lug socket construction of the frame of FIG. 5
Figure 6D:
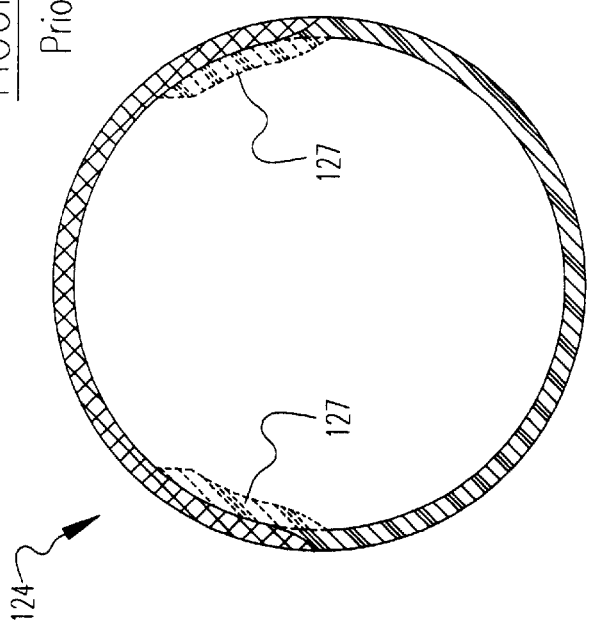
FIGS. 6C and 6D show a comparative prior-art lug socket construction.
Figure 6B:
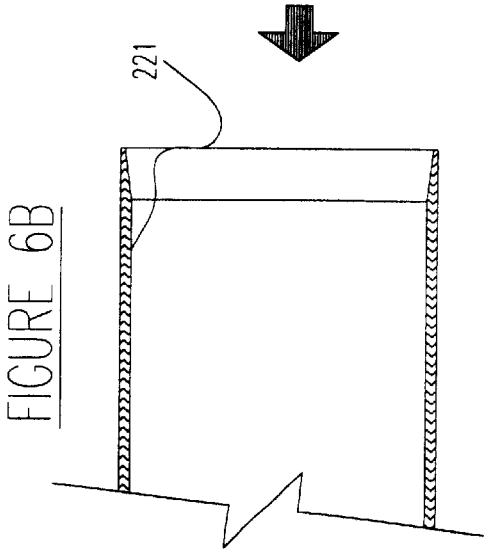

Reference is now made to FIGS. 6A and 6B, which show tube 215 with plug 219 and matching socket in the bottom bracket, respectively. In the illustrated embodiment, the down tubes 215 has a plug 219 at the lower end, which joins with a socket 221 in bottom bracket lug 207. In the invention, the walls of the bottom bracket lug can be made uniform in thickness, requiring minimal machining and removal of material to form the socket 221 in the lug 207.

Figure 6C:
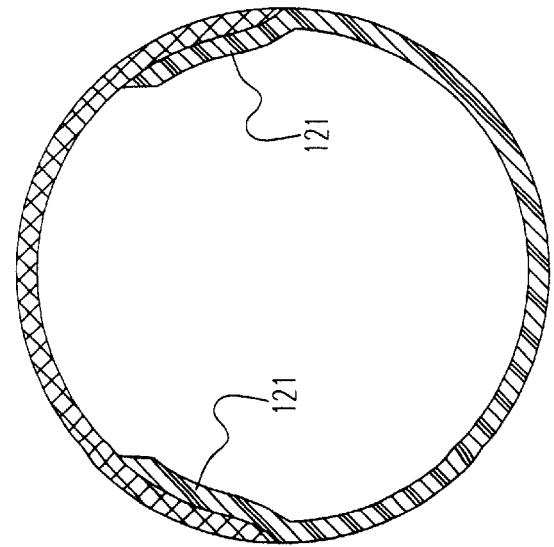

This contrasts with the prior-art, wherein the lug is formed with a lap joint. With reference to FIGS. 6C and 6D. Formation of a socket in a tube 124 as in FIG. 6C would require machining to smooth down the lap joint 119 by removing the overlying lapped portion 127, as illustrated in FIG. 6D by the cross-hatches. This would severely weaken the joint, reducing it to a very weak butt joint. Alternatively, the non-structural material could be added to the inside hollow of the lug to permit machining of a circular socket. This is also undesirable as there would have to be sufficient non-structural material to bring the entire wall to a uniform thickness, at least to the thickness at the lug, which would be a significant addition in weight.

In the prior-art, plugs have been molded into the bottom bracket lugs as well as other lugs because of the difficulty in forming sockets in a molded part with a lap joint. Since prior-art of molding lugs has required three-dimensional parting molds the socket has instead been formed into the tubes, which can be made by less complex processes. In addition, if the plug were to be attached to the tube, the tube becomes a three-dimensional part and has to be made by three-dimensional molding methods that form the lug-joint. Because of this difficulty of forming sockets in the lugs, and the requirement that the tubes be molded as lugged three-dimensional parts if the plugs are on the tubes, the prior-art, for practical purposes, is limited to plugs in the lugs and conventionally formed tubes with machined sockets.

Specific Example of Fabrication of Complex Three-Dimensional Part

Figure 24:
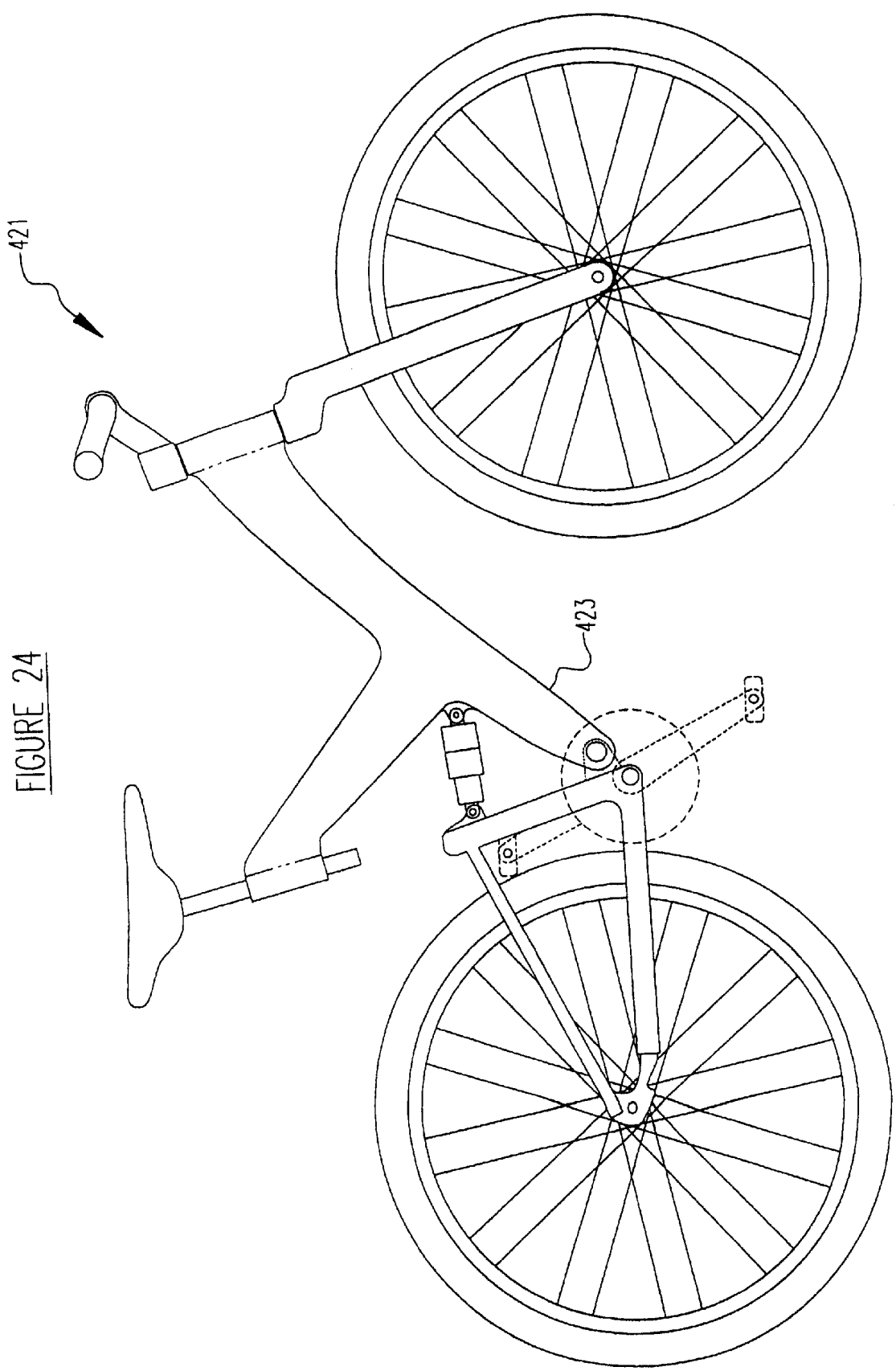
FIG. 24 is a large volume monocoque bicycle of the invention.

This example illustrates fabrication of the head tube lug 203, in FIG. 5. It is understood, that any of the complex three-dimensional parts in FIG. 5, frames of FIGS. 22, and 24, and any other like three-dimensional parts, could be formed in a similar manner.

Reference is now made to FIGS. 7 and 7A, which show plane and top view of a mandrel core 225 for forming a head tube lug. A soluble foam mandrel core 225 is formed from a soluble material that is in the general shape of the final part, but smaller to accommodate the bladder 227 and the prepreg materials, and to allow insertion of the assembly comprising the mandrel core, bladder and preforms of preimpregnated fiber (prepreg) into the mold. While the dimensions of the mandrel core 225 are not critical, it is preferred to have the dimensions as large as practical to minimize movement of the prepreg material during inflation of the bladder 227 in the molding process.

The mandrel core 225 may be formed by any suitable method, such as by molding, or formed from a larger piece using, for example, cutting, sanding, carving, sawing, and the like. When the material of the shape is the preferred steam-blown starch, the shape may be formed from a large block using conventional wood shaping methods.

The mandrel core 225 is of a soluble or removable material that is preferably water soluble, preferably a starch. Since the mandrel core is not required in the actual molding process, it is not necessary that it maintain its integrity in the heat and pressure of the molding environment. Therefore, inexpensive readily available materials are preferred. It is necessary that the solid material be sufficiently soluble to allow its removal after molding. In addition, the material should not form a substance during the molding process that is difficult or impossible to remove. For example, some blown plastic materials, such as styrene foam, while ordinarily very soluble in an organic solvent, collapses into a dense difficult to dissolve solid pea at molding temperatures and pressures. A material should be chosen that does not leave residue in the interior of the finished molded part that would prevent or materially inhibit the removal of the bladder. Preferably the material when dissolved leaves no solid residue, but if a solid residue does remain it should be fine enough to not significantly interfere with bladder removal.

Non-toxic water soluble materials are preferred as water is readily available and easy to dispose of In addition, non-toxic, and non-hazardous materials and processes are preferred for personnel safety and for trouble-free and economical disposal of the wash solution. Other materials that are soluble or react in a sufficient manner for the solid to disintegrate enough to allow removal of the bladder are contemplated, but are generally not preferred, because the solvents required, such as acids and organic liquids, are often expensive, require expensive apparatus for recovery, employee safety, environmental concerns, etc. In general, any material that can be made soluble or disintegrated to allow removal of the bladder from the final molded part is contemplated. This includes materials that are fluid removable, i.e., can be dissolved, or reacted by any suitable fluid, gas or liquid, that is injected into the bladder after the part is molded. Solid materials that can be removed by heating the part to melt or otherwise disintegrate the solid are contemplated, such as low melting-point metal alloys.

In summary, the preferred material is readily soluble in water, is not a hazardous or unsafe material, presents no extensive waste disposal problem, and leaves essentially no residue in the bladder interior that would interfere with easy removal of the bladder from the molded part. Materials that have been found suitable are starch materials, particularly steam blown starch foams. These materials are available under the name ECO-FOAM™, which is made from Hylon VII™ starch from National Starch and Chemical Company, 10 Finderne Ave., Bridgewater, N.J.

Reference is now made to FIGS. 8, 8A, and 9. After the mandrel core is formed, it is surrounded by a flexible bladder 227. The flexible bladder may be of any suitable material that allows placement of the mandrel core 225 within the bladder, is flexible enough to generally conform to the shape, and is capable of being inflated and maintaining an a high internal pressure during the molding process. Preferred materials are heat-resistant thermoplastics, including halohydrocarbon films. A suitable film of this type (1 mil thickness) is available from Airtech Advanced Materials Group, 2542 East Del Arno Blvd, Carson, Calif. 90749-6207, under the name of Wrighton 4500 Release Film.

Other suitable materials, include but are not limited to, PVA and PVAL films which are heat sealable films formed using polyvinyl alcohol. A suitable water soluble PVAL film (2 mil thickness) is a film manufactured by Aicello North America Incorporated, North Vancouver, B.C., Canada and available from Mitsui Plastics, Inc., 11 Martine Ave, White Plains, N.Y. 10606 under the name Solublon KA™. Non heat sealable materials are also contemplated, such as silicone and latex materials.

The bladder 227 is preferably formed in conventional manner for the material from which it is fabricated. For heat-sealable materials conventional thermoplastic heat sealing techniques are used. For complex shapes and curves, special heat sealing elements may be used. A two-panel bag can be formed from separate sheets 233 or a tube by sealing the edges of the bag using a heated sealing bar. The bladder 227 may be also be formed from other suitable methods, such as molding, dipping and curing around a mandrel, and the like, as long as a suitable bladder with the necessary properties can be formed.

The bladder 227 is preferably shaped to approximate the shape of the mandrel core 225. For heat-sealable materials this can be provided in part by placing heat seals 235 as close as practical to the mandrel core 225. In FIGS. 8 and 8A, the film sheets 233 from which the bladder 227 is formed is first formed (as seen particularly in FIG. 8A) in a suitably shaped forming mold before it was heat sealed. Conventional pressure or vacuum thermoforming techniques can be used. An inflation opening 229 is provided for passage of a bladder inflation fitting 239 through which the bladder 227 is eventually inflated. To fabricate the bladder 227, the bladder sheets 233 are heat sealed at seals 235, and the mandrel core 225 inserted into the bag.

Referring to FIGS. 10 and 10A, the bladder fitting 239 is placed in association with the foam mandrel core 225 and extends through the opening 229. The bladder 227 is then fully sealed by the formation of final seal at 237. The bladder fitting 239 is generally tubular and configured to allow sealing of the bladder 227 around the fitting so that the bladder can retain pressure. The bladder fitting 239 may function as a mandrel over which plies for a portions of the molded part may be formed.

In FIG. 9, is shown a bladder 227 formed from two flat (non-vacuum formed) sheets 234 of thermoplastic film. Since the flat sheets 234 must be folded more to conform around the part, the seals 235, and final seal line 237 are placed further from the outer dimensions of the mandrel core than for FIGS. 8 and 8A to allow insertion of mandrel core and final heat sealing of the bladder 227.

Reference is now made to FIGS. 10 and 10A, which shows the mandrel core 225 of FIG. 7 in the bladder 227 of FIG. 8. A bladder fitting 239 extends through the opening and provides air passage for inflation of the bladder 227 during the molding process. The final molded part will have a hole 261 (FIG. 19) left by the bladder fitting 239, so the bladder fitting may be placed at a location to form a hole that has a function in the part. To secure the bladder fitting 239 to the mandrel core 225 the bladder fitting may also include a tube or rod that extends into the foam mandrel (not shown).

Reference is now made to FIG. 10A, which is a detail of the bladder fitting. The bladder fitting comprises an inner sleeve 239a over which lays the bladder 227. The bladder is sealed to the inner sleeve by an outer sleeve 239b.

As noted above for FIGS. 8 and 9, in a preferred method, the bladder 227 is formed by sealing edges of two thermoplastic plies 233, except for a final seal 238 along 237 to leave an open edge for insertion of the foam core 225 and bladder inflation fitting 239. An edge is also left unsealed for an opening for the inflation fitting 229. After insertion of the mandrel core 225 and inflation fitting 239 through the unsealed long edge, a heat seal 238 is formed along 237. To assist the bladder in conforming with the foam mandrel core 225, a vacuum may be drawn on the bladder interior to force the bladder 227 to conform to the mandrel core 225.

Reference is now made to FIGS. 11, and 12. The bladder covered mandrel core 241 provides the firm surface upon which plies of preimpregnated reinforcing fiber are placed. The shapes of the plies, or preforms, are preferably chosen to enhance the interleaving the plies to produce a part that is seamless. One approach is to form preforms, that extend as far as possible around the part. This approach requires a minimum of preforms, and is exemplified in FIG. 11. In FIG. 11 a phantom depiction of the lug 274 and arrows are used to depict the placement and wrapping of the preforms 301, 303, and 305 on the lug. Preform 301 is designed to substantially cover the lug. To reinforce high stress areas of the lug, additional preforms may be placed at those points. For example, preforms 303, 305 are designed to be placed in the saddle-shaped gusset 350 (FIG. 4) of the lug at the aft of the head tube opening, respectively. Similar preforms, mirrors of 301, 303, and 305, are formed for the opposite side of the lug. Each preform shape may be one or multiple unidirectional plies, preferably two placed with a different fiber orientation. Suitable unidirectional carbon prepreg material is manufactured by Danutec Werkstoff GesmnH, Unz, Austria, and is available from Ciba Composites, 5115 East La Palma Ave., Anaheim, Calif. 92807 under the name Strafil CM30SC-EP 1-130J.

Reference is now made to FIG. 12, which illustrates a high-part count approach. In this approach each preform 307, 309, 311, or 313 is of the same standard shape, and several are applied over the mandrel core in an essentially random fashion or sequentially according to a schedule. This approach is particularly adaptable to automation wherein the preforms are robotically placed, or blown (shot) onto the bladder covered mandrel core. The standard shape may be rectangular 307, square 309, elongated elliptic 311, circular or near circular 313, or any other suitable shape, and be a size for easy automatic application, e.g., 0.5×1 inch. A phantom lug 274 is shown for size comparison of the illustrated shapes.

An intermediate part count approach may also be take, wherein the preforms are larger and fewer than the standard preform in FIG. 12, but smaller and more numerous than the preforms of FIG. 11.

Any suitable resin impregnated material used in cured composite parts may be used for the preforms. Preferably, multiple plies of unidirectional carbon fiber materials are used, with fiber orientations chosen for design considerations of the part. The plies are place in an interleaved orientation. Accordingly, no lap joints will be present in the part and there will continuous fiber at any point in the part. This construction is made relatively easy because the uncured plies are laid upon a bladder containing a rigid form mandrel core. In prior-art methods, the rigid surfaces for laying up the plies are the mold halves, which requires that the part have a lapped construction. In the prior-art, except for a minor portion for overlapping at the lap joint, none of the plies extend across both mold halves. In the present invention, since the mold itself is not required for form the assemblage of the uncured fiber plies, the plies can placed to completely avoid undesirable lap joints.

Reference is now made to FIGS. 13 and 14, which shows the mold set assembly 242 from the top and side, respectively, in which the mandrel core, bladder and preforms are molded and cured. The mold set 242 comprises a bottom half 243, top half 245, female part cavity 254, a flash cavity for resin overflow 252, cavity for passage of inflation fitting 247, and O-ring grooves 251. In the mold cavity 254, 258 corresponds to portion that will contain the bladder fitting 239 (FIG. 10), and 259 are portions that correspond to part tag (or trimmed off) portions of the final part.

The pinch landing 253 of the mold is that portion of the mold face immediately adjacent to part cavity 254, and is usually made with tight tolerances so that when the mold is closed it "pinches" off any flow of material from the part cavity. In the prior-art, a particular problem is reinforcing fiber from overlapping preforms in the bottom mold becoming caught in the pinch landings. Because of the tight tolerances, this can particularly cause problems in the proper closing of the mold, and can lead to high stresses that result in damage to the mold, particularly at the pinch landing 253.

Figure 16:
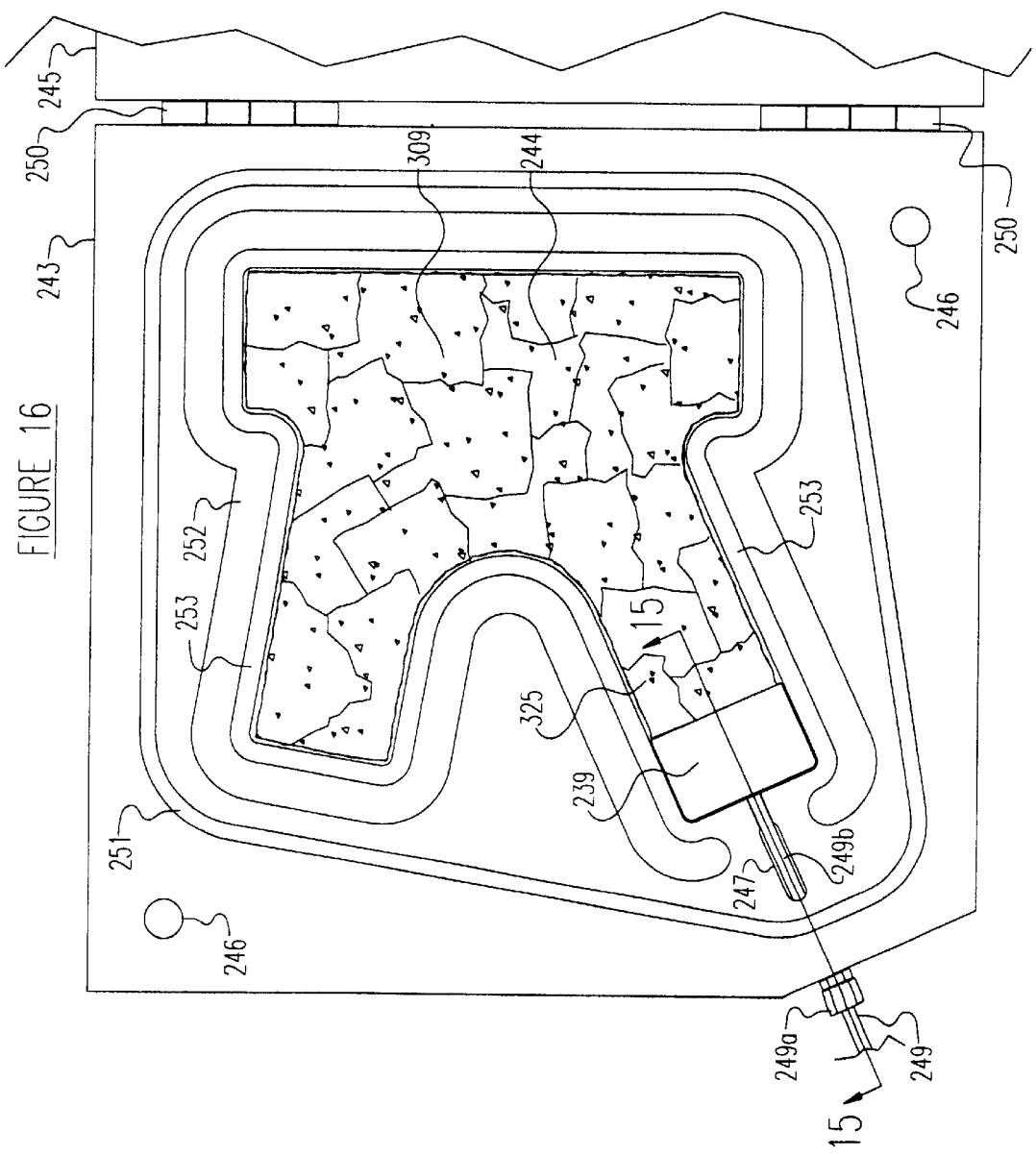
FIG. 16 is top view showing the preform wrapped assembly of FIG. 10 in the bottom half of the mold of FIGS. 13 and 14.

Reference is also made to FIG. 16. After the preforms have been wrapped around the bladder/core/fitting assembly, the wrapped assembly 244 (FIG. 16) is placed into the female mold bottom 243. In FIG. 16, is shown an assembly 244 wrapped with standardized square preforms 309. The bladder 227 is connected through its bladder fitting 239 to an inflation fitting 249 the passes through cavities 247 in the mold 242. The inflation fitting 249 is connected to a suitable pressurization source, e.g., pressurized air or other suitable fluid, through a compression fitting.

Figure 15:
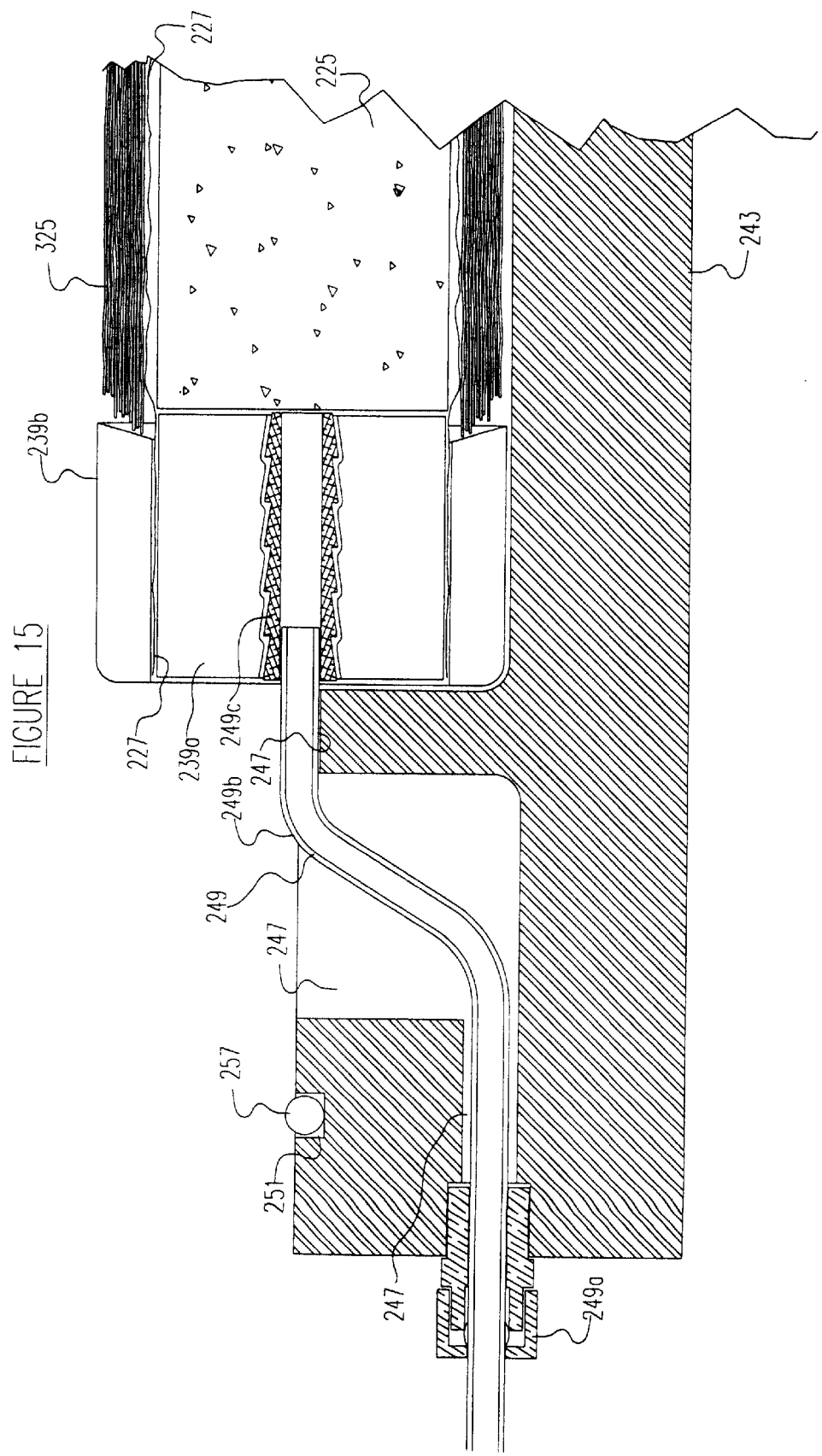
FIG. 15 is a cross-section of the inflation fitting in the mold, showing attachment to the preform wrapped assembly of FIG. 10.
Figure 15A:
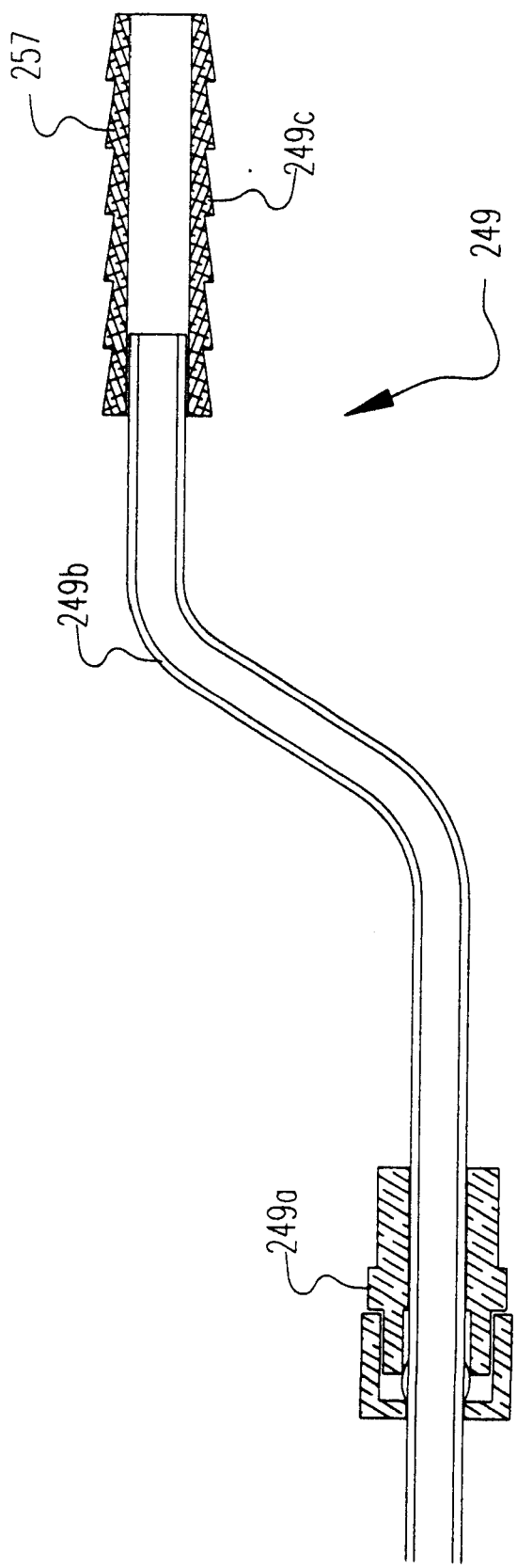
FIG. 15A is a cross-section of the inflation fitting and pressure line of FIG. 15.

Reference is now made to FIG. 15, which show the connection to the inflation fitting and the inflation fitting, and FIG. 15A, which is a detail of the inflation fitting 249. The wrapped assembly 244 comprising mandrel core 225, bladder 227, preforms 309, and bladder fitting 239 is placed in the mold half 243 and attached at its bladder fitting 239 to an inflation fitting 249. The inflation fitting 249 is inserted through the hole 255 in the inner sleeve 239a of the bladder fitting, and is secured by a barbed fitting 249c on the inflation fitting 249. A copper tube 249b of the inflation fitting 249 passes trough the passage cavity 247 and is secured to the mold half by a compression fitting 249a.

The mold is closed by inverting the mold top half 245 and aligning and closing same over the bottom half Inversion and alignment may be assisted by alignment pins 246 and hinge 250 attaching the mold halves 243, 245. Since the preforms 309 are shaped around the mandrel core assembly 241, no preforms are normally present in the top tool half 245, which greatly simplifies closing of the mold 242. Alternately, an outer preform of, for example, cosmetically pleasing woven plies, my be placed in the top mold half 245 before the mold 242 is closed. In general, plies for visual appearance may be placed on any portion of the surface of the wrapped assembly 244.

Figure 17:
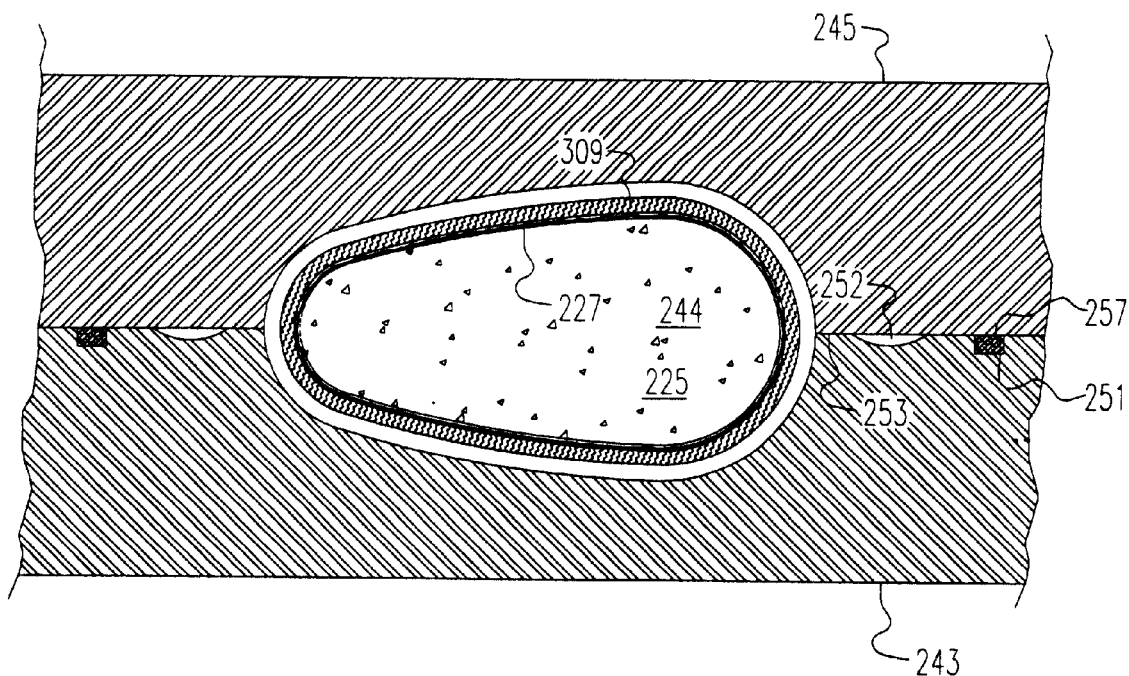
FIGS. 17 and 18 are cross-sections of the preform wrapped assembly of FIG. 10 in the closed mold, showing respectively the bladder uninflated and inflated.
Figure 18:
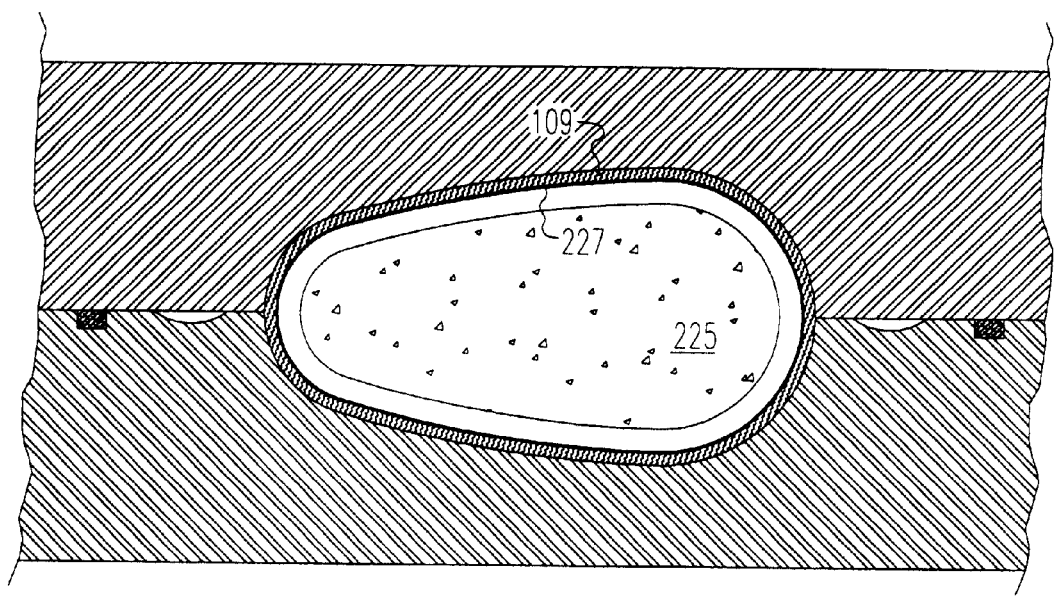

Reference is now made to FIGS. 17 and 18. FIG. 17 is a cross-section showing wrapped assembly 244, with an uninflated bladder 227 in the closed mold 242. As shown in FIG. 18, the bladder 227 is then inflated to compact the preforms 309 against the cavity walls of the mold 242. The mold is then heated to cure the resin The internal pressure of the bladder 227 is used to apply the compaction pressure of the fiber composite materials of the preforms 309 against the female tooling 242. Accordingly, the mandrel core 225 at this point has no further function. The interior molding surface of the part cavity 254 forms and defines the contours of the outer surfaces of the part.

For visual appearance, an outer layer of fibers may be placed around the wrapped core assembly or in either half of the female mold before placement of the assembly into the mold. This outer layer then forms the outer layer of the lug and provides surface appearance. Preferably this outer layer is a cosmetically appealing material such as woven carbon fiber material. Outer structural or non-structural layers may also be placed in the mold, before or after placement of the core/bladder/prepreg assembly 244 in mold 242, rather than wrapping the plies around the core/bladder/fiber assembly.

The bladder 227 is pressurized with a fluid, gas or liquid, preferably air, with a suitable pressure source located outside of the mold. Thus, application of pressure to the composite during cure is not dependent upon expansion of a foaming core material or the any strength properties of the mandrel core. The foam mandrel core 225 in the present invention serves essentially as a mandrel for the initial lay-up of the preform plies and has no function once the actual molding starts. Because of dimensions of the mandrel core 225, the fiber plies before the molding step approximate the shape of the final part, so movement of the plies during inflation of the bladder 227 is minimized.

The timing of the pressure application, the amount of pressure, and timing and extent of the heating of the mold to curing temperature can be optimized by suitable process controllers to produce the desired results. The composite should be fully expanded by the inflatable bladder 227 to the mold walls to form a well compacted high-fiber-content, low-void-content laminate. The pressure may be cycled, or pulsed to produce this result.

The bladder pressure is generally between 200 to 250 psig. However, higher and lower pressures may be used to fit design requirements, and the equipment design limitations. The mold is heated to the temperature required to cure the resin being used.

In order to remove air from the mold that may cause voids in the final part, a vacuum may be applied to the mold cavity via a special port in the mold 248 (FIG. 13) before and during the time the bladder is inflated and the mold is heated. A vacuum seal is obtained by use of an "O"-ring 257 inside "O"-ring groove 251.

The mold 242 may include a thermocouple connections (not shown) for controlling heating of the mold to cure temperatures, and cooling lines for passage of cooling water to cool the mold (not shown).

The mandrel core 225 is dimensioned such that the wrapped core/bladder assembly 244 is dimensioned smaller than the inner dimensions of the mold 242, compensating for any fiber layers or other inserts placed in the mold before the wrapped core/bladder assembly. The mandrel core dimensions are preferably as large a practical, in order to permit a minimum of movement of the composite when the bladder is inflated. This is to discourage wrinkling or off-axis movement of any fibers in the plies. In an exemplary application, the core outer dimension are between about 65% and 85% of the inside dimensions of the female mold cavity (or of the final molded part).

The mandrel core dimensions should allow the mold to be closed without fibers from the wrapped assembly being caught between sections of the mold and extruded outside of the part cavity during molding. In the prior-art oversized preforms with edges extended up from the bottom mold edges are placed in the mold and are folded over before the mold is closed. The oversized preform in the mold often leads to fibers being caught between the mold halves. In the present invention, no preform edges are required near the mold edges, which essentially eliminates this problem.

Cure cycles may be used where the mold temperature is held constant at the full cure temperature. The mold is continuously heated to a predetermined full cure temperature, typically 300° Fahrenheit. The uncured fiber resin part containing the bladder/core/fitting 330 is placed in hot mold 242, the bladder fitting 239 is connected to the barbed fitting 249c of the inflation fitting 249. The mold 242 is closed and the bladder inflation starts immediately. Before inflation, the bladder 227 may also be pulsed to hammer the preforms 309 into the female mold cavity. The mold 242 is not cooled at all after cure, it is just removed from the clamping press and opened. The cured part is removed from the mold while the mold is still hot. The mold cleaning operation, and mold release operations are also performed on the hot mold. This cure cycle reduces the molding time considerably.

Figure 19:
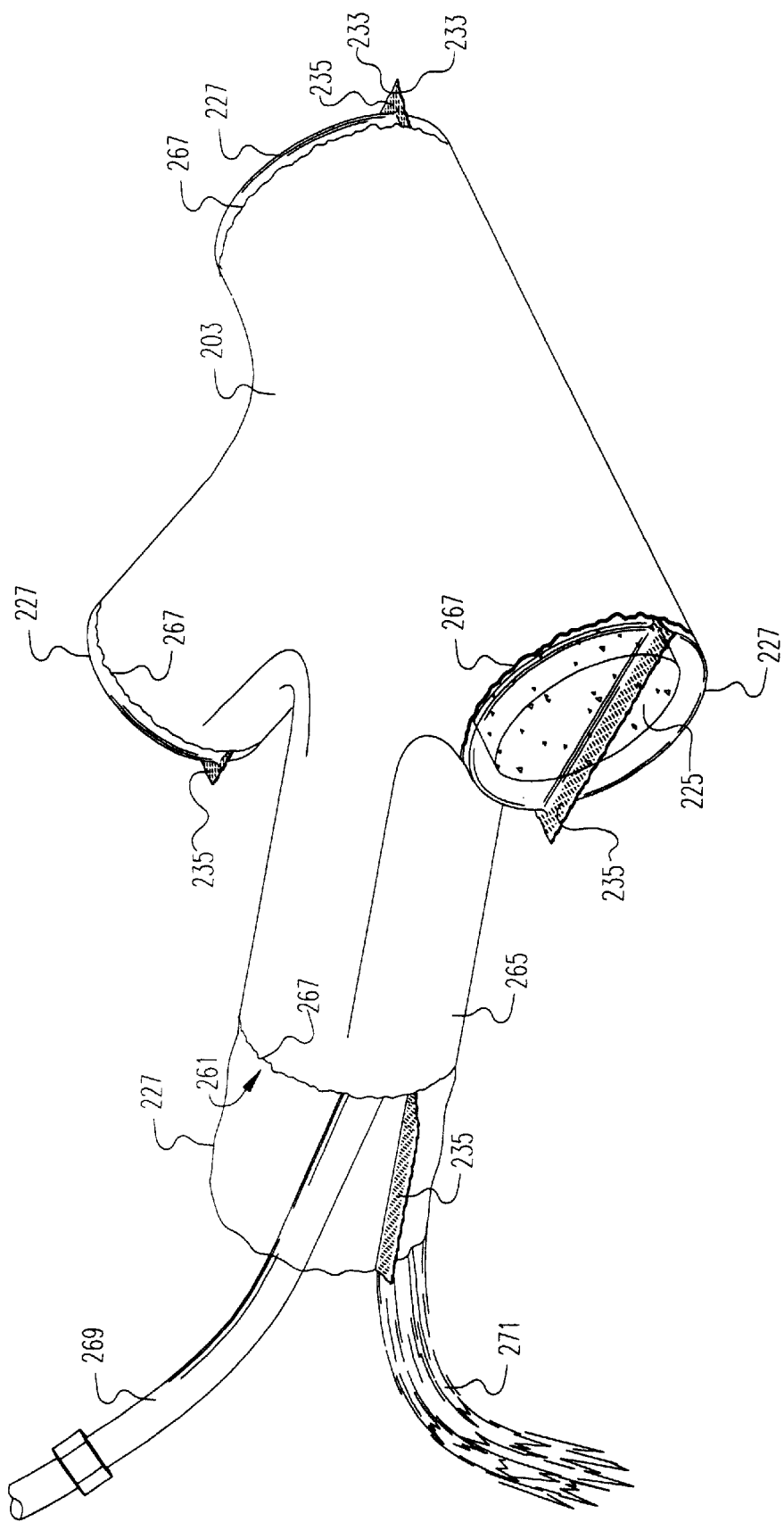
FIG. 19 shows a cured part with the bladder fitting removed and water being injected inside to remove the mandrel core.

Reference is now made to FIG. 19. After the resin is cured, the bladder 227 is depressurized, the part 203 removed from the mold, and the inflation fitting is removed from the part. The part 203 has an opening 261 where the inflation fitting formerly was placed. Unfinished or tag end edges 267 define openings in the part and are subsequently trimmed. It is not desirable to leave the bladder 227 and core 225 within the molded head tube lug 203, so both are removed after molding. After removal of the bladder fitting, the core 225 is removed by injecting water 271 into the bladder 227 using an appropriate water injection fitting and hose 269 to dissolve and wash out the foam core. As shown in FIG. 19, water is injected through the opening in the bladder left after removal of the bladder fitting 239 (FIG. 16). The water may be heated or contain suitable additives, dispersants, or the like, to assist in dissolving and dispersing the core material. Any liquid or gaseous material, such as a solvent or a reactive material that causes disintegration of the solid core 225 by, for example, by solvation, chemical reaction, or the like, sufficient to allow removal of the bladder 227 is contemplated by the invention.

After the core 225 is removed by dissolving, the bladder 227 is easily removed by pulling it out through the hole 261 through which the bladder fitting 239 occupied (or alternately any other hole). If the bladder 227 is of a water-soluble material, it may also be fully or partially dissolved when the core 225 is removed.

After the bladder and core are removed the part may be finished as needed. For example, the ends of the lug may be trimmed and machined for sockets, for adhesive attachment to tubes, as shown in FIGS. 4 and 5.

The final molded head tube lug 203 is generally hollow. The wall thickness may be essentially uniform wall thickness or by design vary in thickness by adding or deleting plies at preselected portions. Since the preforms are interleaved, there is no lap joint that is thicker than the adjacent wall, and no reinforcing material required for such a lap joint. The interior 263 is essentially free of any of the molding materials, e.g., core, core residues, bladder or bladder residues. The only remaining components of the final part are structural elements, i.e., the reinforced fiber composite, and any inserts that may be included in the part. There are essentially no materials that are remnants of the molding process and have no function in the final molded part, but would add undesirable weight to the part.

Figure 20A:
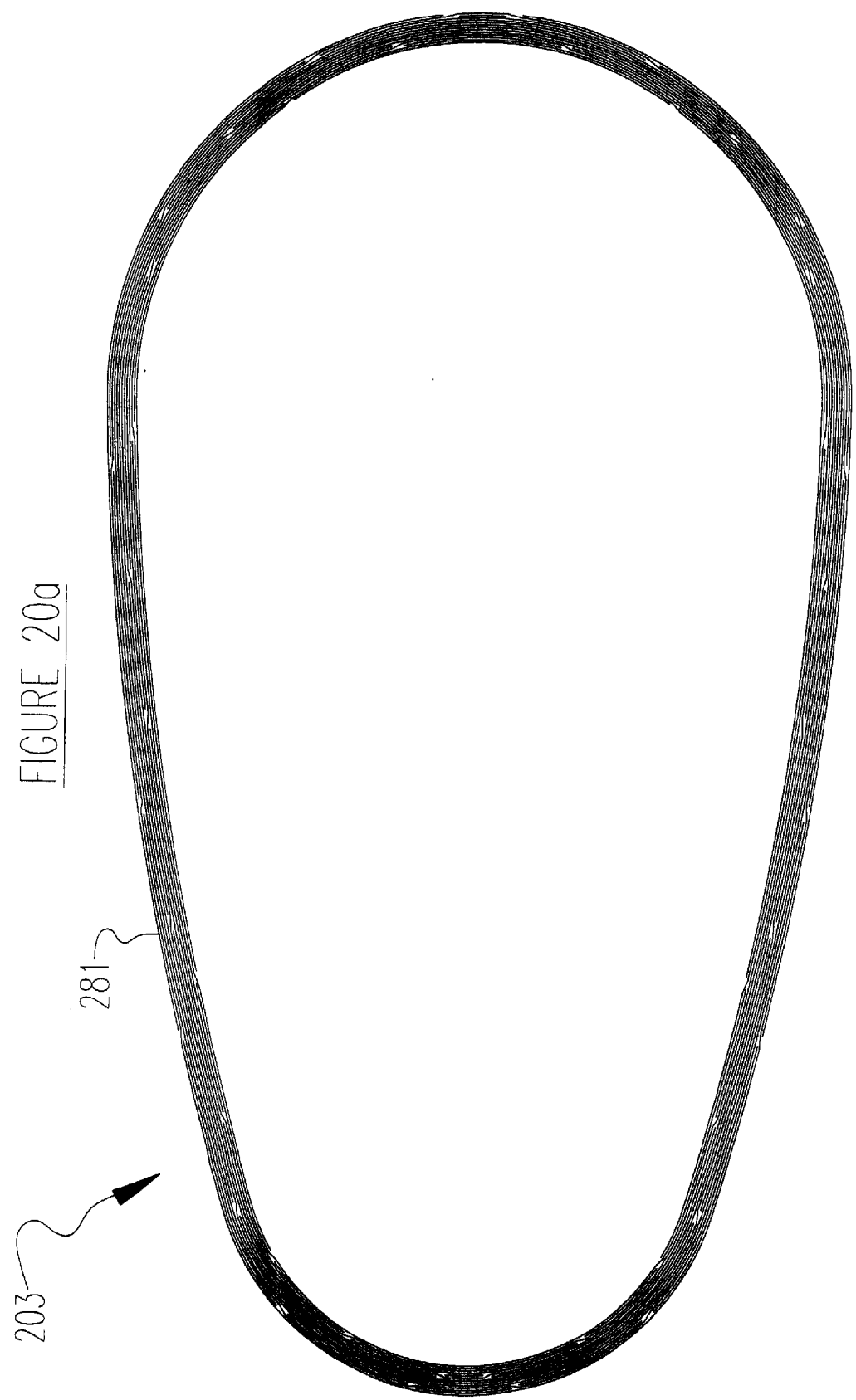

Reference is now also made to FIGS. 20A, and 20B which are schematic cross-sections of lug 203 in FIG. 5 along the circumferential planes shown in FIG. 5. In these figures the wall is expanded to show the plies. There is no point where several plies that are adjacent end is a manner to form a lap joint. The only portion where terminations of adjacent plies are even near each other are at drop-offs 283 to change the thickness of the wall. At any straight line path through the wall of the part, even at ply terminations, there are multiple plies continuous across the path.

Figure 20C:
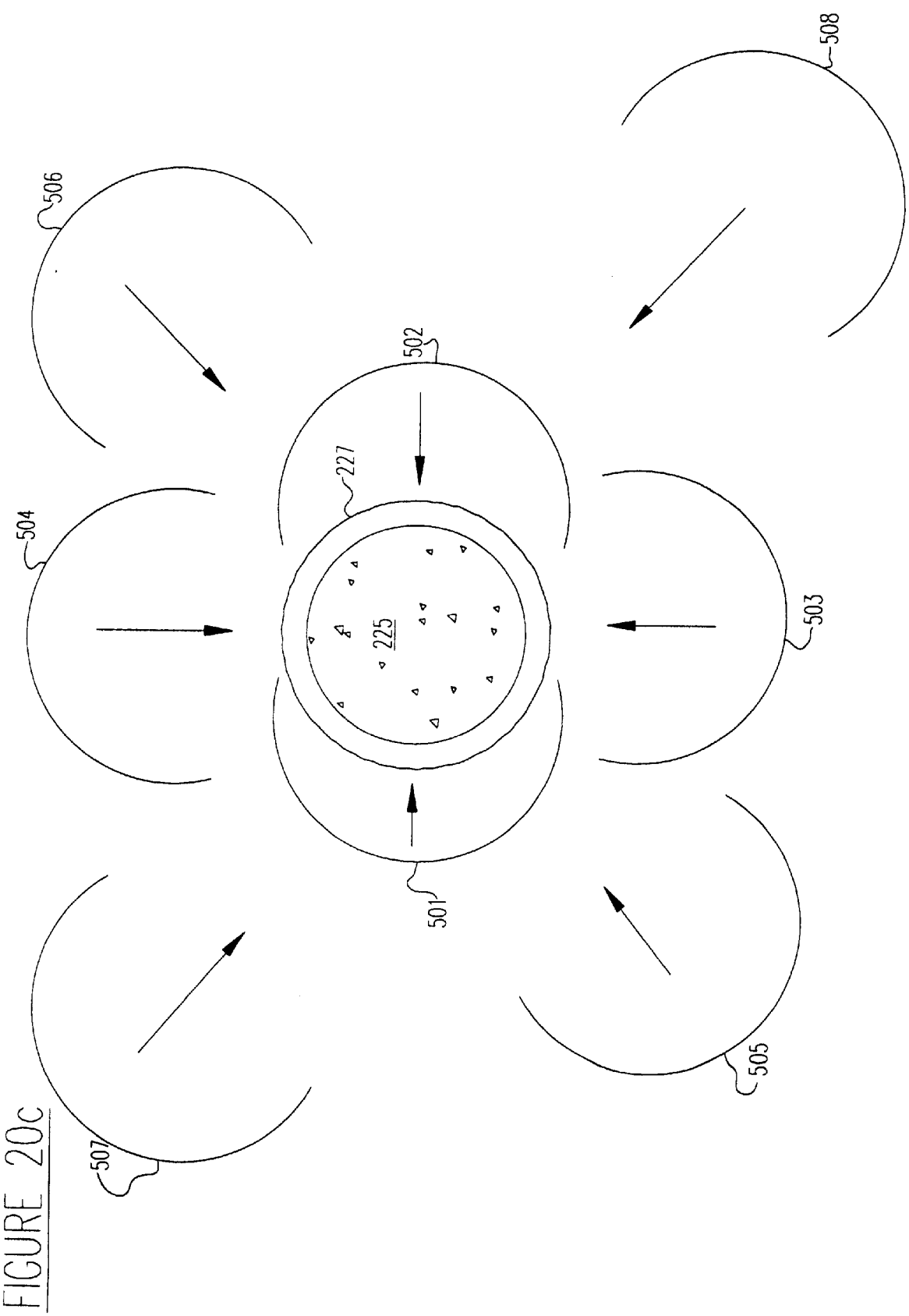
Figure 20D:
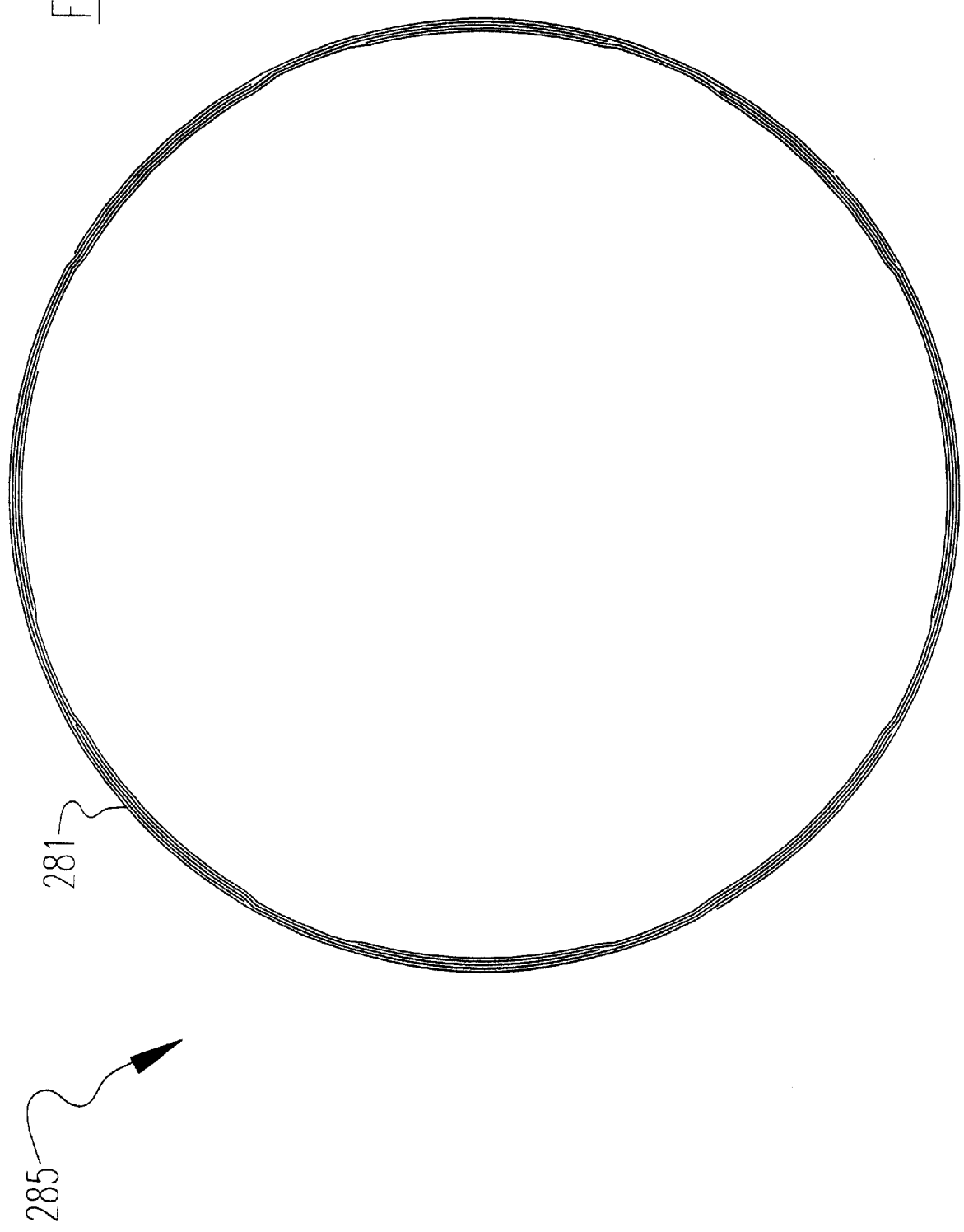

Reference is now made to FIGS. 20C, 20D, and 20E. In these figures are simplified cross-sections of a cured part illustrating the interleaved relationship of the plies. In FIG. 20C, the plies 501, 502, 503, 504, 506, 507, 508 are shown as a exploded view, showing their relationship around a mandrel core 225 and bladder 227. Ply 501 is the first ply layer, with 502, 503, . . . as overlying layers in numerical order. Referring to FIG. 20D, which shows a view with the wall expanded to show the plies, the terminations 281 to not occur at the same point, and there are significant continuous fibers at each point in the part wall. Referring to FIG. 20E, which is a detail of a portion of the wall of FIG. 20D, the shortest path 287 through the wall without crossing any fiber plies is very convoluted and doubles back several times. The interleave ratio is clearly orders of magnitude higher than that illustrated for a prior-art part illustrated in FIGS. 3, 3A, and 3B.

Figure 21:
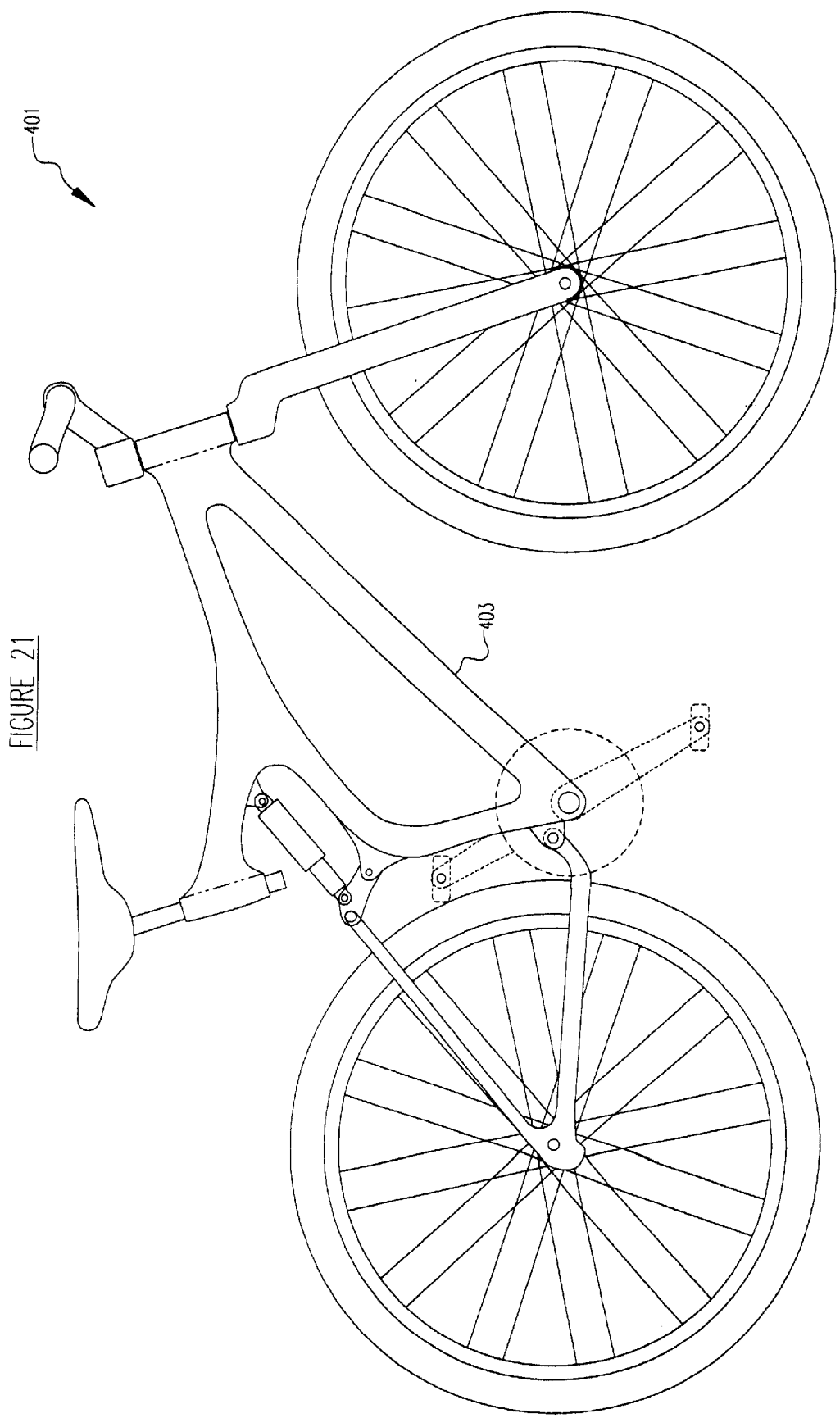
FIG. 21 is a tubular monocoque bicycle of the invention.
Figure 22:
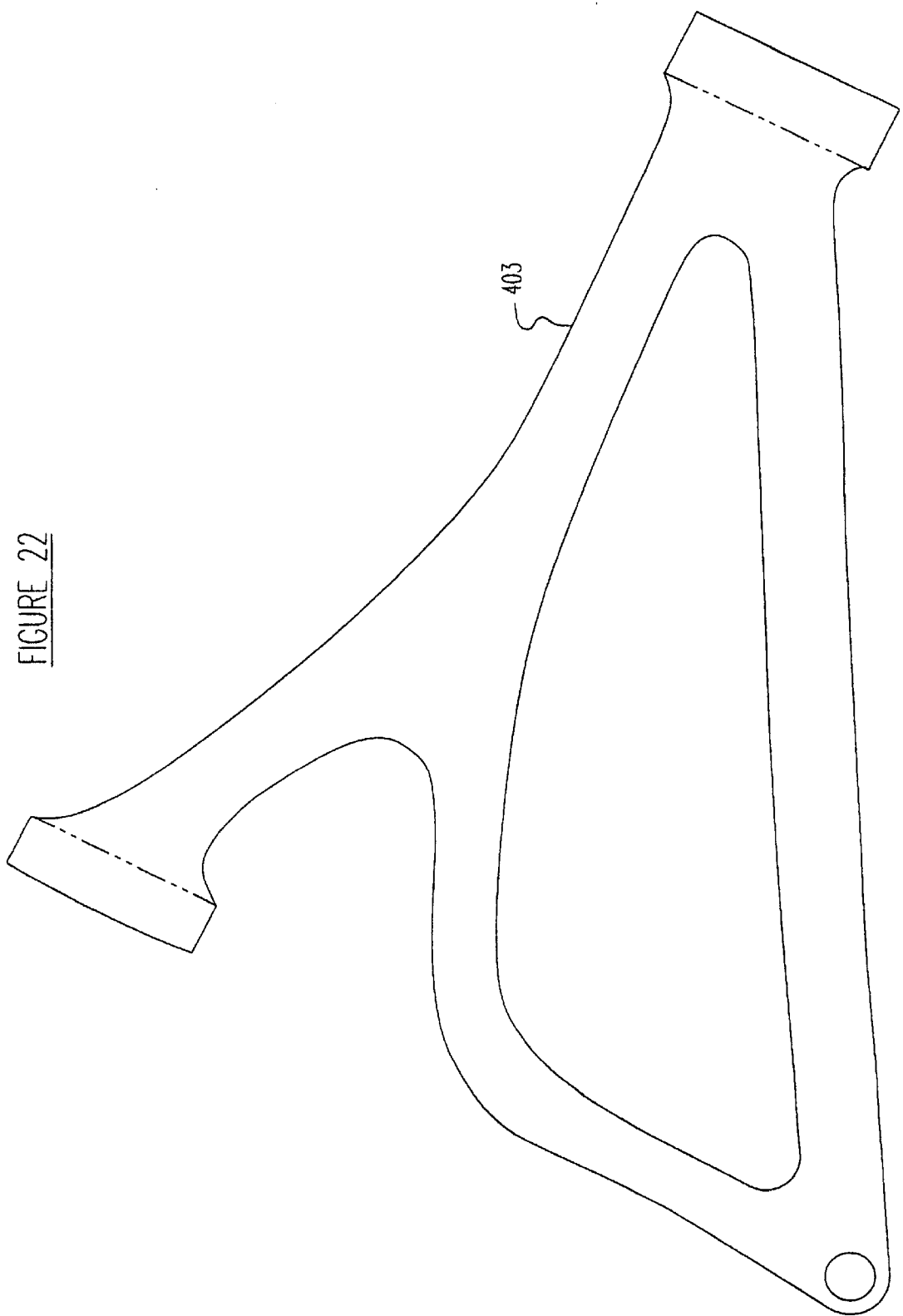
FIG. 22 is the frame of the bicycle of FIG. 21.
Figure 23:
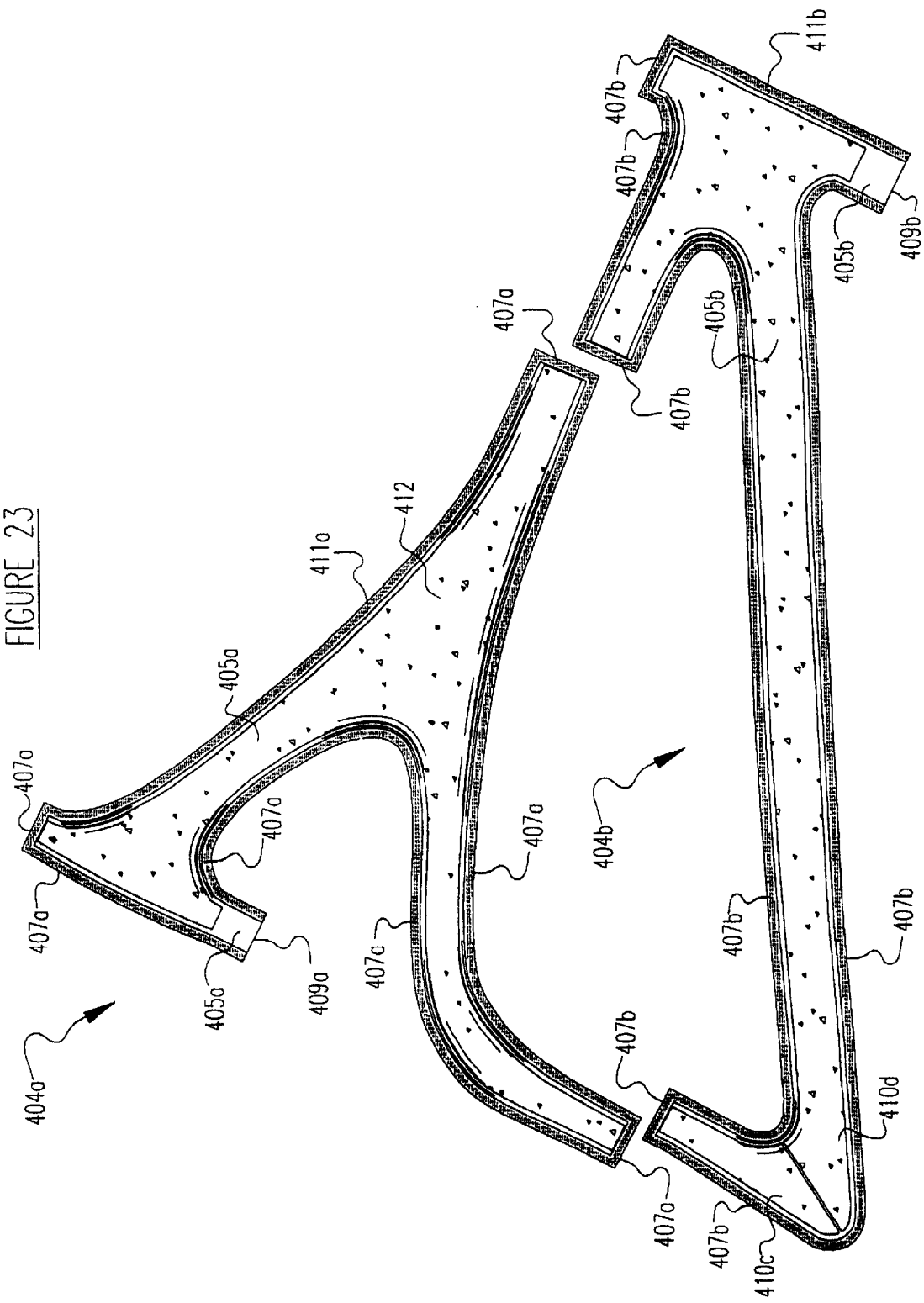
FIG. 23 is a bladder used for manufacturing the frame of FIG. 22.

Reference is now made to FIG. 21, which shows a bicycle 401 with a tubular monocoque frame 403. The frame 403, further illustrated in FIG. 22 is a hollow complex three-dimensional composite part that is made according to the process of the invention. The process is essentially the same as described above for head tube lug, but with appropriately shaped mandrel core and bladder. The preforms are likewise designed particularly for forming the tubular monocoque frame. In FIG. 23 is an illustration a set of bladders 405a and 405b, that may be used in this process. The bladders 405a, 405b are first sealed along seals 407a, 407b. Mandrel core 410a is inserted into bladders 405a, and mandrel cores 410b and 410c inserted into bladder 405b, respectively. The bladders 405a, 405b and subsequently sealed at 411a, 411b, respectively. Edges are left unsealed to leave openings 409a, 409b for a bladder fitting constructed essentially as illustrated above. The bladder/mandrel core assemblies 404a, 404b are then wrapped in preforms, and cured to final parts in a manner similar to that described above. It is understood that the same part in FIG. 22 could be made with more bladders or just a single bladder, with a single or multiple mandrel cores in each bladder. The mold would then be equipped with appropriate inflation fittings for each bladder.

Figure 25:
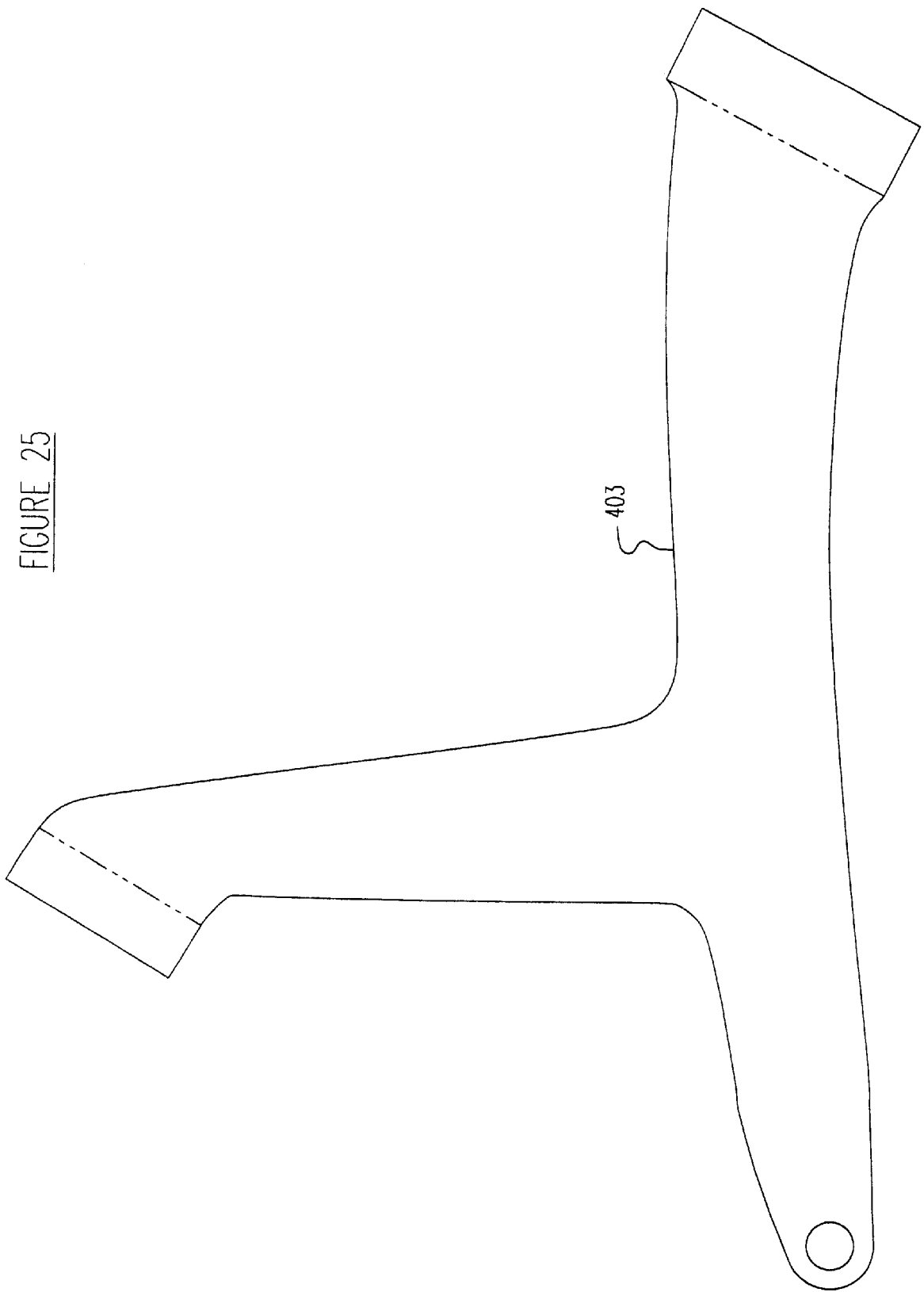
FIG. 25 is the frame of the bicycle of FIG. 24.
Figure 26:
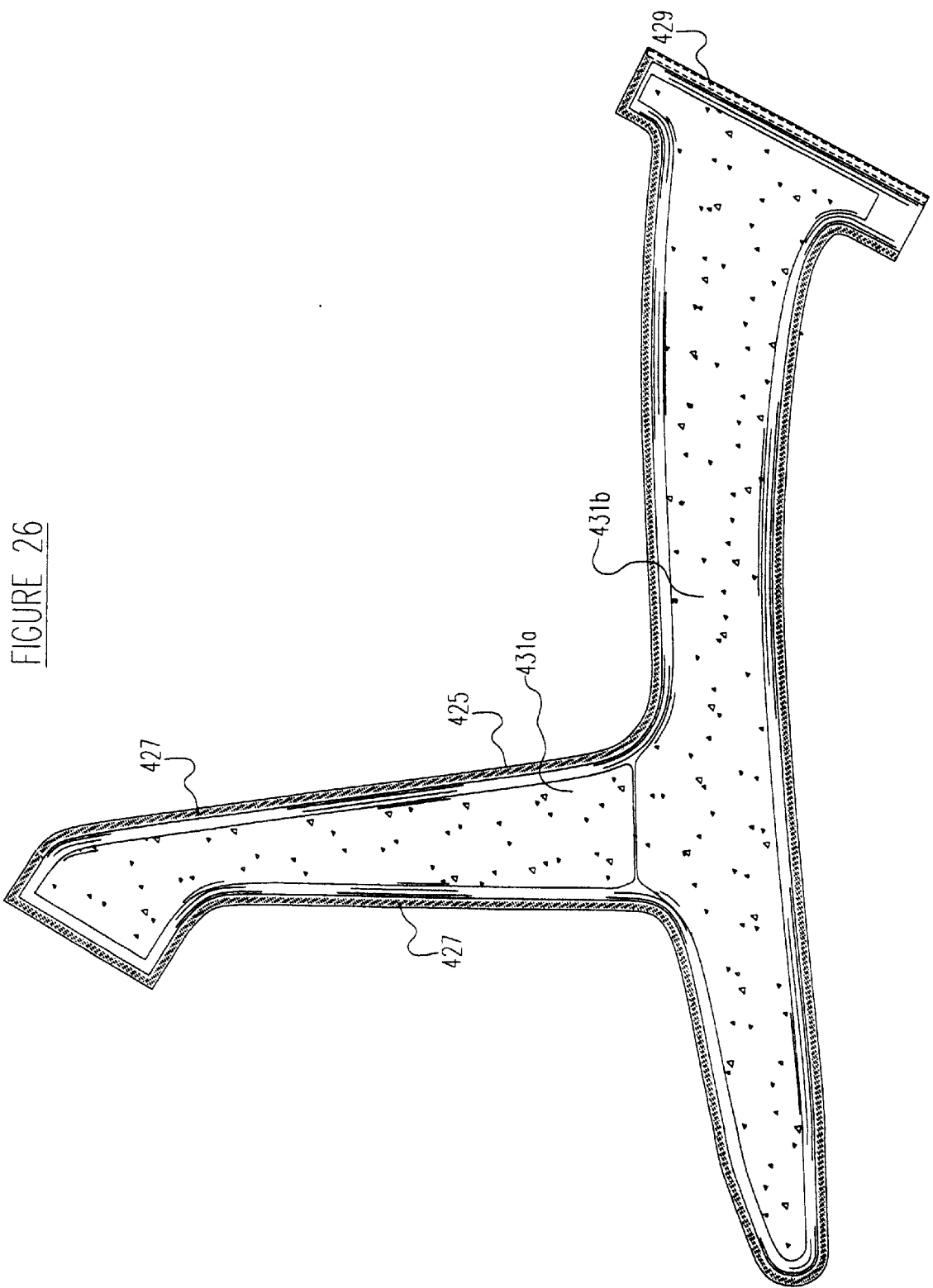
FIG. 26 is a bladder used for manufacturing the frame of FIG. 25.

Reference is now made to FIG. 25, which shows a bicycle 421 with a large volume monocoque frame 423. The frame, further illustrated in FIG. 26 is a hollow complex three-dimensional composite part that is made according to the process of the invention. The process is essentially the same as described above for the head tube lug, but with appropriately shaped mandrel core and bladder. The preforms are likewise designed particularly for forming the large volume monocoque frame. In FIG. 26 is an illustration a bladder 425 that may be used in this process. Initial heat seals are formed along lines 427 and a appropriately shaped mandrel core of cores 431a, 431b are inserted. The mandrel cores are then sealed in the bladder 425 by forming heat seals along lines 429.

CONCLUSION AND SCOPE OF THE INVENTION

It will be apparent that the composite lug parts produced using the method of the invention can be molded to any desired configuration, to be used with composite tubes in constructing any configuration of bicycle frame. With the method of the invention a bicycle frame is produced that is made entirely of composite materials, is entirely hollow and can be mass produced, with repeatability, reliability and strength of parts, while achieving a low frame weight. The cured composite material making up lug parts has no overlapping joints and is of uniform thickness throughout. A minimum amount of manual labor is required in the production of parts.

Although a preferred embodiment of the bicycle frame and method of making a bicycle frame has been herein disclosed, it is to be understood that the present disclosure is made by way of example and that variations are possible without departing from the subject matter coming within the scope of the following claims, which subject matter is regarded as the invention.

What is claimed is:

1. A composite bicycle frame comprising at least one complex three-dimensional molded hollow composite bicycle lug with an interior essentially free of non-structural elements, the lug having walls of multiple interleaved plies of reinforcing fiber placed to obtain an interleave ratio greater than about 30 throughout the wall, the part having an internal shape that requires that an internal mandrel conforming to the general internal shape of the lug be a disintegratable mandrel to allow removal of the mandrel.

2. A composite bicycle frame as in claim 1 wherein the interleave ratio is greater than about 100.

3. A composite bicycle frame comprising at least one bicycle lug with a hollow interior, the lug having a complex three-dimensional shape containing multiple saddle shaped gusset areas, the lug having a wall of multiple plies of reinforcing fibers placed to obtain an interleave ratio greater than about 30 throughout the wall.

4. The composite bicycle frame of claim 3 wherein the hollow interior is free of nonstructural molding-assist residues.

5. A composite bicycle frame comprising at least one bicycle lug with a hollow interior, the lug having a complex three-dimensional shape containing multiple saddle shaped areas forming gusset areas, the lug having a wall of multiple plies of reinforcing fibers placed to obtain an interleave ratio greater than about 30 throughout the wall, the hollow interior being free of any nonstructural molding-assist residues, the lug have an internal shape that requires that an internal mandrel conforming to the general internal shape of the lug be a disintegratable mandrel to allow removal of the mandrel.

* * * * *